US012667835B2

(12) United States Patent
Zhou et al.

(10) Patent No.: US 12,667,835 B2
(45) Date of Patent: Jun. 30, 2026

(54) SYSTEMS FOR CATALYTICALLY REMOVING OXIDIZED CONTAMINANTS FROM A FLUID AND RELATED METHODS

(71) Applicant: Arizona Board of Regents on Behalf of Arizona State University, Scottsdale, AZ (US)

(72) Inventors: Chen Zhou, Chandler, AZ (US); Bruce Rittman, Tempe, AZ (US); Dandan Zhou, Changchun (CN); Yihao Luo, Phoenix, AZ (US); Min Long, Phoenix, AZ (US); Chenwei Zheng, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 601 days.

(21) Appl. No.: 18/002,454

(22) PCT Filed: Jun. 17, 2021

(86) PCT No.: PCT/US2021/037959

§ 371 (c)(1),
(2) Date: Dec. 19, 2022

(87) PCT Pub. No.: WO2022/015462

PCT Pub. Date: Jan. 20, 2022

(65) Prior Publication Data

US 2023/0226535 A1     Jul. 20, 2023

Related U.S. Application Data

(60) Provisional application No. 63/040,513, filed on Jun. 17, 2020.

(51) Int. Cl.
| | |
|---|---|
| *B01J 37/00* | (2006.01) |
| *B01J 23/44* | (2006.01) |

(Continued)

(52) U.S. Cl.
CPC ........... *B01J 37/0072* (2013.01); *B01J 23/44* (2013.01); *B01J 23/46* (2013.01); *B01J 35/45* (2024.01); *B01J 35/59* (2024.01); *B01J 37/18* (2013.01)

(58) Field of Classification Search
None
See application file for complete search history.

(56) References Cited

U.S. PATENT DOCUMENTS

| | | | |
|---|---|---|---|
| 4,662,938 A | 5/1987 | Whitney | |
| 6,387,262 B1 | 5/2002 | Rittmann | |

(Continued)

FOREIGN PATENT DOCUMENTS

| | | |
|---|---|---|
| WO | 2006087334 A1 | 8/2006 |
| WO | 2017136528 A1 | 8/2017 |

OTHER PUBLICATIONS

Johnson, P. Dawson, B. V; Goldberg, S. J. "A Review: Trichloroethylene Metabolites: Potential Cardiac Teratogens." Environ. Health Perspect. 1998, 106 (suppl 4), 995-999.

(Continued)

*Primary Examiner* — John J Figueroa
(74) *Attorney, Agent, or Firm* — FULLER IP LAW LLC; Rodney J. Fuller

(57) ABSTRACT

The present invention relates to systems and methods for catalytic removal of oxidized contaminants (for example, nitrite, chromate, chlorate, trichloroethene, CFC-11, 4-nonylphenol, RDX, and perfluorooctanoate) from water and wastewater. In some aspects, the catalytic method of removing oxidized contaminants comprises using precious metal nanoparticles as catalysts to reduce the oxidized contaminants.

19 Claims, 15 Drawing Sheets

(51) Int. Cl.

| | | |
|---|---|---|
| *B01J 23/46* | (2006.01) | |
| *B01J 35/45* | (2024.01) | |
| *B01J 35/59* | (2024.01) | |
| *B01J 37/18* | (2006.01) | |

(56) References Cited

U.S. PATENT DOCUMENTS

| | | | |
|---|---|---|---|
| 7,279,103 | B2 | 10/2007 | Burckle |
| 8,318,017 | B2 | 11/2012 | Fane |
| 8,591,915 | B2 | 11/2013 | Buetow |
| 8,696,913 | B2 | 4/2014 | Casey |
| 9,233,863 | B2 | 1/2016 | Cable |
| 9,890,052 | B2 | 2/2018 | Banerjee |
| 9,902,634 | B2 | 2/2018 | Friese |
| 10,273,174 | B2 | 4/2019 | Syron |
| 12,168,622 | B2 * | 12/2024 | Tang ......................... B01J 35/45 |
| 2005/0158595 | A1 * | 7/2005 | Marsh ...................... B01J 23/40 |
| | | | 429/421 |
| 2007/0090057 | A1 | 4/2007 | Burckle |
| 2008/0302720 | A1 | 12/2008 | Bowman |
| 2010/0230359 | A1 | 9/2010 | Whitehead |
| 2011/0118105 | A1 * | 5/2011 | Schwank ................. B01J 38/12 |
| | | | 429/479 |
| 2012/0074071 | A1 | 3/2012 | Hassler |
| 2012/0280179 | A1 * | 11/2012 | Marsh ..................... F17C 11/00 |
| | | | 252/372 |
| 2017/0015968 | A1 | 1/2017 | Parameswaran |
| 2020/0157523 | A1 | 5/2020 | Semprini |
| 2021/0179463 | A1 | 6/2021 | Zhou |
| 2024/0336504 | A1 * | 10/2024 | Zhou ...................... B01D 69/02 |
| 2025/0236544 | A1 * | 7/2025 | Long ...................... B01J 23/468 |

OTHER PUBLICATIONS

Just C.L., J.L. Schnoor, (2004) "Phytophotolysis of hexahydro-1, 3, 5-trinitro-1, 3, 5-triazine (RDX) in leaves of reed canarygrass," Environ Sci Technol, 38, 290-295.

Karanasios K., I. Vasiliadou, S. Pavlou, D. Vayenas, (2010) "Hydrogenotrophic denitrification of potable water:a review," J HazardMater, 180, 20-37.

Karges, U; Becker, Püttmann, W. "1,4-Dioxane Pollution at Contaminated Groundwater Sites in Western Germany and Its Distribution within a TCE Plume." Sci. Total Environ. 2018, 619-620, 712-720. https://doi.org/l().1016/j.scitotenv.2017.1 1043.

Kim, Y. Jeon, Muruge:san, Kim, E,-J, and Chang, Y.-S. (2009) "Biodegradation of I , 4-dioxane and transformation of related cyclic compounds by a newly isolated Mycobacterium sp PH-06." Biodegradation 20(4), 511. 9 pages.

Kirszensztejn P., L. Wachowski, A. Szymkowiak, P. Marciniak, B. Czajka, W. Skupinski, (2003) "Catalytic Conversion CCI [sub3] F and CCI [sub2] F [sub2] over Metal SupportedCatalysts," Polish Journal of Environmental Studies, 12, 9 pages.

Klaewkla R. , M. Arend, W.F. Hoelderich, (2011) "A review of mass transfer controlling the reaction rate in heterogeneous catalytic systems," INTECH Open Access Publisher Rijeka, 19 pages.

Kotsyurbenko, O R.. M. V. Glagolev, A. N. Nozhevnikova and R. Conrad (2001). "Competition between homoacetogenic bacteria and methanogenic archaea for hydrogen at low temperature," 153-159.

Lakshminarayana B., K.A. Kumar, M. Selvaraj, G. Satyanarayana, S. (2020) "Ch, PVP-PS supported ultra-small Pd nanoparticles for the room temperature reduction of 4-nitrophenol," Journalof Environmental ChemicalEngineering, 103899. 7 pages.

Leaist, D.G and P A. Lyons (1981). "Multicomponent diffusion of electrolytes With incomplete dissociation diffusion in a buffer solution." The Journal of Physical Chemistry 85(12), 1756-1762.

Lee S.-J., H.-S. Son, H.-K. Lee, K.-D. Zoh, (2002) "Photocatalytic degradation of explosives contaminatedwater," Water SciTechnol, 46 (2002) 139-145.

Leiknes, T., & Ødegaard, H. (2007). "The development of a biofilm membrane bioreactor." Desalination, 202(1-3), 135-143.

Lien, H.L.; Zhang, W. X. "Nanoscale Pd/Fe Bimetallic Particles: Catalytic Effects of Palladium on Hydrodechlorination." Appl. Catal. B Environ. 2007, 77 (1-2), 110-116. https://doi.org/10.10160.apcatb.2007.07.014.

Liu Z., Y. He, F. Li, Y. Liu, (2006) "Photocatalytic treatment of RDX wastewaterwith nano-sized titanium dioxide (5 pp)," Environmental Science and Pollution Research 13, 328-332.

Liu, Z , Zhou, C, Ontiveros-Valencia, A. Luo, Y.H., Long, NL, Xu, H. and Rittmann, WE. (2018) "Accurate 02 delively enabled benzene biodegradation through aerobic activation followed by denitrification-coupled mineralization." Biotechnology and Bioengineering. 12 pages.

Lowry, G. V and Reinhard, M. (1999) "Hydrodehalogenation Of I-to 3 Carbon halogenated organic compounds in water using a palladium catalyst and hydrogen gas" Environmental Science & Technology 33(11), 1905-1910.

Lowry, G. V. and Reinhard, M. (2001 ) "Pd-catalyzed TCE dechlorination in water: effect of and H2-utilizing competitive solutes on the TCE dechlorination rate and product distribution." Environmental science & technology 35 (4), 696-702.

Maharajh, D. M and J. Walkley (1972). "Lowering of the saturation solubility of oxygen by the presence of another gas." Nature 236(5343): 165.

Mahendra, S., Petzold, C.J., Baidoo, E.E., Keasling. J.D. and Alvarez-Cohen, L. (2007) "Identification of the intermediates of in vivo oxidation of 1,4-dioxane by monooxygenase-containing bacteria," Environmental Science & Technology 41(21), 7330-7336.

Mahendra, S.; Grostern, A.; Alvarez-Cohen, L. "The Impact of Chlorinated Solvent co-Contaminants on the Biodegradation Kinetics of 1,4-Dioxane." Chemosphere 2013, 91 (I), 88-92. https://doi.org/10.1016/j.chemosphere.2012.10.104.

Matteucci, F, , C, Ercole and M, del Gallo (2015), "A study of chlorinated solvent contamination of the aquifers of an industrial area in central Italy: a possibility of bioremediation Front." Microbiol. 6, 924. 10 pages.

Maymó-Gatell, X. , Y-C Chien, J, M, Gossett and S. H, Zinder (1997), "Isolation of a bacterium that reductively dechlorinates tetrachloroethene to ethene." Science 276(5318): 1568-1571.

Maymó-Gatell, X., V. Tandoi, J.M. Gossett and S.H. Zinder (1995). "Characterization of an H2 utilizing enrichment culture that reductively dechlorinates tetrachloroethene to vinyl chloride and ethene in the absence of methanogenesis and acetogenesis," Appl. Environ. Microbiol. 61(11); 3928-3933.

Moon B.-H., Y.-B. Park, K.-H. Park, (2011) "Fenton oxidation of Orange II by pre-reduction using nanoscalezero-valent iron," Desalination,268, 249-252.

Moran, M.L, Zogorski, JS and Squillace, P.L (2007) "Chlorinated solvents in groundwater ofthe United States." Environmental science & technology 41(1), 74-81.

Mori, V , Kubo, and Morikawa, Y (2004) "Hydrodechlorination Of I, I, I-trichloroethane over silica-supported palladium catalyst." Applied Catalysis A: General 271(1-2), 69-76.

Mundle, S.O, T. Johnson, G Lacrampe-Couloume, A Perez-de-Mora, M. Duhamel, E. A. Edwards, M. L McMaster, E. Cox, K Révész and B. Sherwood Lollar (2012) "Monitoring biodegradation of ethene and bioremediaticm of chlorinated ethenes at a contaminated site using compound-specific isotope analysis (CSIA)." Environmental science & technology 46(3); 1731-1738.

Ni, BJ., Liu, H., Nie, YQ., Zeng, RJ., Du, Chen, and Yu, HQ. (2011) "Coupling glucose fermentation and homoacetogenesis for elevated acetate production: experimental and mathematical approaches." Biotechnology and bioengineering 108(2), 345-353.

Nutt, Hughes, J and MS. (2005) "Designing Pd-on-Au bimetallic nanoparticle catalysts for trichloroethene hydrodechlorination." Environmental science & technology 39(5), 1346-1353.

Oh S.-Y. , P.C. Chiu, B.J. Kim, D.K. Cha, (2005) "Zero-valent iron pretreatment for enhancing the biodegradabilityof RDX," WaterRes, 39, 5027-5032.

Omole M.A., I.O. K'Owino, O.A. Sadik, (2007) "Palladium nanoparticles for catalytic reduction of Cr (VI) using formic acid," Applied Catalysis B: Environmental, 76, 158-167.

(56) References Cited

OTHER PUBLICATIONS

Ordóñez S., M. Makkee, J. Moulijn, (2001) "Performance of activated carbon-supported noble metal catalysts in the hydrogenolysis of CCl3F," Applied Catalysis B: Environmental, 29, 13-22.

Parales, Adamus, White, N, and May, H. (1994) "Degradation of 1, 4-dioxane by an actinomycete in pure culture." Applied and Environmental Microbiology 60(12), 45274530. 4 pages.

Picioreanu, C, M C. Van Loosdrecht and L J. Heijnen (2000). "Effect of diffusive and convective substrate transport on biofilm structure formation: a two-dimensional modeling study" Biotechnology and bioengineering 69(5): 504-515.

Pouretedal H.R. , M.H. Keshavarz, M.H. Yousefi, E.A. Shokr, A. Zali, (2009) "Photodegradation of HMX and RDX in the presence of nanocatalyst of zinc sulfide doped with copper," 9 pages.

Qian A., P. Liao, S. Yuan, M. Luo, (2014) "Efficient reduction of Cr (VI) in groundwater by a hybridelectro-Pd process," Water Res, 48, 326-334.

Qian H. , Z. Zhao, J.C. Velazquez, L.A. Pretzer, K.N. Heck, M.S. Wong, (2014) "Supporting palladium metal on gold nanoparticles improves its catalysis for nitrite reduction," Nanoscale, 6, 358-364.

Rittmann B., et al., "Synergistic Reductive Dechlorination of 1,1,1-Trichloroethane and Trichloroethene and Aerobic Biodegradation of 1,4-Dioxane", SERDP, (Feb. 1, 2019), pp. 1-116, XP055888219.

Scheutz, C.; Durant, N. Hansen, M. H.; Bjerg, P. L. "Natural and Enhanced Anaerobic Degradation of 1, 1,1-Trichloroethane and Its Degradation Products in the Subsurface—A Critical Review." Water Research, 2011, 45 (9), 2701-2723. https.'//doi.org/10.1016/j.watres.2011.02.027.

Schreier, C G; Reinhard, M. "Catalytic Hydrodehalogenation of Chlorinated Ethylenes Using Palladium and Hydrogen for the Treatment of Contaminated Water." Chemosphere 1995, 31 (6), 3475-3487. https://doi.org/10.1016/0045-6535 (95)00200-R.

Shuai D., B.P. Chaplin, J.R. Shapley, N.P. Menendez, D.C. McCalman, W.F. Schneider, C.J. Werth, (2010) "Enhancement of oxyanion and diatrizoate reduction kinetics using selected azo dyes on Pd-based catalysts," Environ Sci Technol, 44, 1773-1779.

Śrębowata A., W. Lisowski, J.W. Sobczak, Z. Karpiński, (2015) "Hydrogen-assisted dechlorination of 1,2-dichloroethane on active carbon supported palladium-copper catalysts," CatalToday, 175, 576-584.

Stewart, P S. (1993). "A model of biofilm detachment." Biotechnology and bioengineering 41(1): 111-117.

Stickney, J. A.; Sager, S. L. , Clarkson, J. R_; Smith, L. A.; Locey, B. J .; Bock, M. J; Hartung, R. , Olp, S. F. "An Updated Evaluation of the Carcinogenic Potential of 1,4-Dioxane." Regul. Toxicol. Pharmacol. 2003, 38 (2), 183-195.

Sung, Y, K.E. Fletcher, K.M. Ritalahti, R.P Apkarian, N. Ramos-Hernández, R.A. Sanford, N.M. Mesbah and F.E. Löffler (2006), "Geobacter lovleyi sp. nov strain SZ, a novel metal-reducing and tetrachloroethene-dechlorinating bacterium." Appl, Environ. Microbiol. 72(4): 2775-2782.

Tajima M., M. Niwa, Y. Fujii, Y. Koinuma, R. Aizawa, S. Kushiyama, S. Kobayashi, K. Mizuno, H. Ohuchi, (1996) Decomposition of chlorofluorocarbons in the presence of water over zeolitecatalyst, AppliedCatalysisB: Environmental, 9, 167-177.

Tang, Y, H. Zhao, A. K. Marcus, R. Krajmalnik-Brown and B. Rittmann, (2012) "A steady-state biofilm model for simultaneous reduction of nitrate and perchlorate, part I model development and numerical solution." Environmental Science & Technology 46(3): 1598-1607.

Tang, Y, R. Krajmalnik-Brown and B. E. Rittmann (2013). "Modeling trichloroethene reduction in a hydrogen-based biofilm." Water Science and Technology 68(5): 1158-1163.

U.S. Environmental Protection Agency, National primary Drinking Water Regulations. 2009, 7 pages.

USEPA. Contaminant Information Sheets (CISs)for the Final Fourth Contaminant Candidate List (CCL 4); 2018. 337 pages.

Adamson, D. T .; Anderson, R. Mahendra, S.; Newell, C. J. "Evidence of 1,4-Dioxane Attenuation at Groundwater Sites Contaminated with Chlorinated Solvents and 1,4-Dioxane." Environ. Sci. Technol. 2015, 49 (I I), 6510-6518. https://doi.org/l().1021/acs.est.5b00964.

Adamson, D. T .; McDade, J. M.; Hughes, J. B. "Inoculation ofa DNAPL Source Zone to Initiate Reductive Dechlorination of PCE." Environ. Sci. Technol. 2003, 37 (11), 2525-2533. https://doi.org/10.1021 /es020236y.

Adamson, D.T., Mahendra, S., Walker Jr, KL., Rauch, SR. Sengupta, S. and Newell, (2014) "A multisite survey to identify the scale of the 1, 4-dioxane problem at contaminated groundwater sites." Environmental Science & Technology Letters I(S), 254-258.

Anderson, R.H., Anderson, J.K. and Bower, P.A. (2012) "Co-occurrence of 1, 4-dioxane with trichloroethylene in chlorinated solvent groundwater plumes at US Air Force installations; Fact or fiction?" Integrated environmental assessment and management 8(4), 731-737.

Aulenta, F. L M. Gossett, M. P Papini, S Rossetti and M. Majone (2005) "Comparative study of methanol, butyrate, and hydrogen as electron donors for long term dechlorination of tetrachloroethene in mixed anerobic cultures" Biotechnol. Bioeng 91 (6): 743-753.

Bakke, B.; Stewart, P.A.; Waters, M.A. "Uses of and Exposure to Trichloroethylenein US Industry: A Systematic Literature Review." J. Occup. Environ. Hyg 2007, 4 (5), 375-390.

Bernhardt, D and Diekmann, VI (1991) "Degradation of dioxane, tetrahydrofuran and other cyclic ethers by an environmental Rhodococcus strain." Applied microbiology and biotechnology 36(1), 120-123.

Burback, B.L and Perry, J.J. (1993) "Biodegradation and biotransformation of groundwater pollutant mixtures by Mycobacterium vaccae." Applied and Environmental Microbiology 59(4), 1025-1029.

Chambon, J.C, P.L Bjerg, C. Scheutz, J. Bælum, R. Jakobsen and P J. Binning (2013). "Review of reactive kinetic models describing reductive dechlorination of chlorinated ethenes in soil and groundwater" Biotechnol. Bioeng. 110(1): 1-23.

Chambon. L, Lemming, G, Broholm, NL, Binning PA. and Bjerg, P.L (2009) "Model assessment of reductive dechlorination as a remediation technology for contaminant sources in fractured clay: Modeling Tool Delrepport II." Danish Environmental Protection Agency. 75 pages.

Chan, W. W. M.; Grostern, A.; Löffler, F. E.; Edwards, E. A. "Quantifying the Effects of Trichloroethane and I,I-Dichloroethane on Chlorinated Ethene Reductive Dehalogenases." Environ. Sci. Technol. 2011, 45 (22), 9693-9702. https://doi.org/10.1021/es201260n.

Chaplin, B,P., Reinhard, M., Schneider, W.F., Schiith, C., Shapley, J.R, Strathmann, T.J, and Werth, C J. (2012) "Critical review of Pd-based catalytic treatment of priority contaminants in water." Environmental Science & Technology 46(7), 3655-3670.

Chen X., X. Huo, J. Liu, Y. Wang, C.J. Werth, T.J. Strathmann, (2017) "Exploring beyond palladium: Catalytic reduction of aqueous oxyanion pollutants with alternative platinum group metalsand new mechanistic implications," ChemicalEngineering Journal, 313, 745-752.

Chen, D.Z., Jin, X,-J., Chen, Ye, J .- X. Jiang N.X and Chen, J.M, (2016) "Intermediates and substrate interaction of 1,4-dioxane degradation by the effective metabolizer Xanthobacterfiavus International Biodeterioration & Biodegradation" 106, 133-140.

Choe J.K., M.I. Boyanov, J. Liu, K.M. Kemner, C.J. Werth, T.J. Strathmann, (2014) "X-ray spectroscopic characterization of immobilized rhenium species in hydrated rhenium-palladium bimetallic catalysts used for perchlorate water treatment," The Journal of PhysicalChemistryC, 118, 11666-11676.

Christ, J A, and Abnolm L.M. (2007) "Modeling metabolic reductive dechlorination in dense non-aqueous phase liquid source-zones Advances in water resources" 30(6-7), 1547-1561.

Chung, J. , R. Krajmalnik-Brown and B. Rittmann. E (2007). "Bioreduction of trichloroethene using a hydrogen-based membrane biofilm reactor" Environmental science & technology 42(2):477-483.

Chung, J. and B. E Rittmann (2008) "Simultaneous bio-reduction of trichloroethene, trichloroethane, and chloroform using a hydrogen-based membrane biofilm reactor" Water Science and Technology 58(3): 495-501.

(56)　　　　References Cited

OTHER PUBLICATIONS

Chung, J. and Rittmann, B.E. (2007) "Bio-reductive dechlorination of 1,1,1-trichloroethane and chloroform using a hydrogen—based membrane biofilm reactor." Biotechnology and Bioengineering 97(1), 52-60.

Clapp, L.W., Semmens, M.J., Novak, and Hozalski, RAL (2004) "Model for in situ perchloroethene dechlorination via membrane-delivered hydrogen." Journal of Environmental Engineering 130(11), 1367-1381.

Crawford, L, Jones, DG_, Llados, F., Risher, L and Tencza, B (2012) "Toxicological profile for 1,4-dioxane." 295 pages.

Cupples, A.M., Spormann, A.M. and McCarty. PL. (2004) "Vinyl chloride and cis-dichloroethene dechlorination kinetics and micro-organism growth under substrate limiting conditions." Environmental science & technology 38(4), 1102-1107.

Davie, M.G., Cheng, HD, Hopkins, G,D., LeBron, C.A. and Reinhard, M. (2008) "Implementing heterogeneous catalytic dechlorination technology for remediating TCE-contaminated groundwater." Environmental science & technology 42 (23), 8908-8915.

Delannoy L., J.- M. Giraudon, P. Granger, L. Leclercq, G. Leclercq, (2000) "Group VI transition metal carbides as alternatives in the hydrodechlorination of chlorofluorocarbons," Catal Today, 59, 231-240.

Delgado, A. G., P Parameswaran, D., Fajardo-Williams, R. U. Halden and R. Krajmalnik-Brown (2012). "Role of bicarbonate as a pH buffer and electron sink in microbial dechlorination of chloroethenes." Microb. Cell Fact. 11(1) 128.

Delgado, A.G., Fajardo-Williams, D, Popat, S.C., Torres, C.I. and Krajmalnik-Brown, R. (2014) "Successful operation of continuous reactors at short retention times results in high-density, fast-rate Dehalococcoides de-chlorinating cultures." Applied Microbiology and Biotechnology 98(6), 2729-2737.

Delgado, A.G., Kang. Nelson. K.G., Fajardo-Williams, D., Miceli III. Jif Done, H. Popat, S.C and Krajmalnik-Brown, R (2014) "Selective enrichment yields robust ethene-producing dechlorinating cultures from microcosms stalled at cis-dichloroethene" Plos one 9(6), e100654, 10 pages.

Deng, D.; Li, F.; Li, M. "A Novel Propane Monooxygenase Initiating Degradation of 1,4-Dioxane by Mycobacterium dioxanotrophicus PH-06." Environ. Sci. Technol. Lett. 2018, 5 (2), 86-91. https://doi.org/10.1021/acs.estlett.7b00504.

Dong Z., X. Le, Y. Liu, C. Dong, J. Ma, (2014) "Metal organic framework derived magnetic porous carbon composite supported gold and palladium nanoparticles as highly efficient and recyclable catalysts for reduction of 4-nitrophenol and hydrodechlorination of 4-chlorophenol," Journal of Materials Chemistry A, 2 18775-18785.

Dugat-Bony, E., Biderre-Petit, C., Jaziri, F u, David, MM., Denonfoux, J., Lyon, D.Y., Richard, JVY., Curvers, C, Boucher. D. and Vogel, Tim. (2012) "In situ TCE degradation mediated by complex dehalorespiring communities during biostimulation processes." Microbial biotechnology 5(5), 642-653.

Dumas, O.;Despreaux, T.; Perros, F.; Lau, E.;Andujar, P.; Humbert, M.;Montani,D.; Descatha, A. "Respiratory Effects of Trichloroethylene." Respir. Med. 2018, 134, 47-53.

EPA "2012 Edition of the Drinking Water Standards and Health Advisories." United States 2012. 20 pages.

Fennell, D. E. and J. M. Gossett (1998). "Modeling the production of and competition for hydrogen in a de-chlorinating culture," Envimn. Sci. Technol. 32(16); 2450-2460.

Freeberg, K., Bedient, P and Connor, J. (1987) "Modeling of TCE contamination and recovery in a shallow sand aquifer" Groundwater 25(1), 70-80.

Gong J. , C .- S. Lee, Y.-Y. Chang, Y.-S. Chang, (2015) "Novel self-assembled bimetallic structure of Bi/Fe 0: the oxidative and reductive degradation of hexahydro-1, 3, trinitro-1,3, 5-triazine (RDX)," J HazardMater,286, 107-117.

Grostern, A.; Chan, W.W.M .; Edwards, E.A. "1,1, I-Trichloroethane and 1,1- Dichloroethane Reductive Dechlorination Kinetics and Co-Contaminant Effects in a Dehalobacter-Containing Mixed Culture." Environ. Sci. Technol. 43 (17), 6799-6807. 2009, https://doi.org/10.1021/es901038x.

Guo et al., (2013) "Membrane fouling of hybrid submerged membrane bioreactor (hMBR) in treating municipal wastewater" Balaban Desaliniation Publications, doi: 10.1080/19443994.2013.831778. 11 pages.

Guo S. , K. Heck, S. Kasiraju, H. Qian, Z. Zhao, L.C. Grabow, J.T. Miller, M.S. Wong, (2017) "Insights into nitrate reduction over indium-decorated palladium nanoparticle catalysts," ACS Catalysis, 8, 503-515.

Guy K.A., H. Xu, J.C. Yang, C.J. Werth, J.R. Shapley, (2009) "Catalytic nitrate and nitrite reduction with Pd-Cu/PVP colloids in water: Composition, structure, and reactivity correlations," The Journal of Physical Chemistry C, 113, 8177-8185.

Haston, Z.C. and McCarty, P.L. (1999) "Chlorinated ethene half-velocity coefficients for reductive dehalogenation." Environmental Science & Technology 33(2), 223-226.

He, J., Holmes, V.F., Lee, P,K, and Alvarez-Cohen, L, (2007) "Influence of vitamin B12 and co-cultures on the growth of Dehalococcoides isolates in defined medium." Applied and Environmental Microbiology 73(9), 2847-2853.

He, J., K. M. Ritalahti, KL-L Yang, S.S. Koenigsberg and F. E. Löffler (2003). "Detoxification of vinyl chloride to ethene coupled to growth of an anaerobic bacterium." Nature 424(6944): 62. 4 pages.

He, J., Y Sung, R. Krajmalnik-Brown, K. M. Ritalahti and F E. Löffler (2005). "Isolation and characterization of Dehalococcoides sp. strain FL2, a trichloroethene (TCE)-and I, 2- dichloroethene-respiring anaerobe" Environ. Microbiol. 7(9): 1442-1450.

Heck, KN., Nutt, M.O., Alvarez, P. and Wong, M.S. (2009) "Deactivation resistance of Pd/Au nanopanicle catalysts for water-phase hydrodechlorination." Journal of Catalysis 267(2), 97-104.

Hirvonen, X, Tuhkanen, T. and Kalliokoski, P. (1996) "Treatment ofTCE-and PCE contaminated groundwater using UV/H202 and O3/H202 oxidation processes" Water Science and Technology 33(6), 67-73.

Huang, D and Becker, J .G. (2009) "Determination of intrinsic monod kinetic parameters for two heterotrophic tetrachloroethene (PCE)-respiring strains and insight into their application." Biotechnology and bioengineering 104(2), 301-311.

Inoue, D.; Tsunoda, T.; Sawada, K .; Yamamoto, N.; Saito, Y.; Sei, K.; Ike, M. "1,4-Dioxane Degradation Potential of Members of the Genera Pseudonocardia and Rhodococcus." Biodegradation 2016, 27 (4-6), 277-286. https://doi.org/10.1007/s10532-016-9772-7.

Isaka, K., Udagawa, M., Sei, K. and Ike, NL (2016) "Pilot test of biological removal of 1,4-dioxane from a chemical factory wasten, vater by gel carrier entrapping Afipia strain" D1 Journal of hazardous materials 304, 251-258.

Jin, L., Ong, S. L., & Ng, H. Y. (2013). "Fouling control mechanism by suspended biofilm carriers addition in submerged ceramic membrane bioreactors." Journal of membrane science, 427, 250-258.

Johnson, D. A. Nemir, G. L. Andersen, S. H. Zinder and L Alvarez-Cohen (2009), "Transcriptomic microarray analysis of corrinoid responsive genes in Dehalococcoides ethenogenes strain 195." FFMS Microbiol. Lett. 294(2): 198-206.

Vainberg, S., Condee, C.W and StetYan, R.J. (2009) "Large-scale production of bacterial consortia for remediation of chlorinated solvent-contaminated groundwater." Journal of Industrial Microbiology & Biotechnology 36(9), 1189-1197.

Vainberg, S.; McClay, K.; Masuda, H.; Root, D.; Condee, C.; Zylstra, G.; Steffan, R.J. (2006) "Biodegradation of Ether Pollutants by Pseudonocardia Sp. Strain ENV478." Applied and Environmental Microbiology 72(8), 5218-5224.

Varfolomeyev, S. Kalyuzhnyy, S and Spivak, S. (1989) "Kinetic regularities of methane production by a methanogenic association," Applied biochemistry' and biotechnology 2213, 351-360.

Vavilin, V, Lokshina, LN., Rytov, S., Kotsyurbenko, O, Nozhevnikova, A and Parshina, S. (1997) "Modelling methanogenesis during anaerobic conversion of complex organic matter at low temperatures." Water Science and Technology 36(6-7), 531-538.

Wang K., S. Shu, M. Chen, J. Li, K. Zhou, J. Pan, X. Wang, X. Li, J. Sheng, F. Dong, (2020) "Pd-TiO2 Schottky heterojunction cata-

(56) References Cited

OTHER PUBLICATIONS lyst boost the electrocatalytic hydrode chlorination reaction," ChemicalEngineeringJournal, 381, 122673. 8 pages.

Yang Q. , F. Yao, Y. Zhong, D. Wang, F. Chen, J. Sun, S. Hua, S. Li,X. Li, G. Zeng, (2016) "Catalytic and electrocatalytic reduction of perchlorate in water—a review," Chemical EngineeringJournal, 306, 1081-1091.

Yang Q., F. Yao, Y. Zhong, F. Chen,X. Shu, J. Sun, L. He, B. Wu, K. Hou, D. Wang, (2019) "Metal-Organic Framework Supported Palladium Nanoparticles: Applications and Mechanisms," Particle& ParticleSystems Characterization, 36, 1800557. 19 pages.

Yang, L., Qiu, H., Lu, Z., Zhang, C., Liu, G., Chang, J., . . . & Xiao, F. (2023). "Effect of Membrane Fouling with Different Backwash Mode for Ultrafiltration" Process in Municipal Wastewater: Hydraulic Backwash and Backwash with Sodium Hypochlorite. 20 pages.

Yu, S; Dolan, M. E.; Semprini, L. "Kinetics and Inhibition of Reductive Dechlorination of Chlorinated Ethylenes by Two Different Mixed Cultures."Environmental science & technology 2005, 39(1), 195-205.

Yu, S. and L. Semprini (2004). "Kinetics and modeling of reductive dechlorination at high PCE and TCE concentrations." Biotechnology and bioengineering 88(4), 451-464.

Zeebe, R.E. (2011) "On the molecular diffusion coefficients of dissolved C02, HC03-, and C032- and their dependence on isotopic mass." Geochimica et CosmochimicaActa 75(9), 2483-2498.

Zenker, M.j, Borden, R.C. and Barlaz M.A. (2003) "Occurrence and treatment of 1,4-dioxane in aqueous environments." Environmental Engineering Science 20(5), 423-432.

Zhang, S.; Gedalanga, P. B.; Mahendra, S. (2016) "Biodegradation Kinetics of 1,4-Dioxane in Chlorinated Solvent Mixtures." Environmental science & technology, 50 (17), 9599-9607.

Zhang, X., Guo, J., Wang, L., Hu, J., & Zhu, J. (2013). "In situ ozonation to control ceramic membrane fouling in drinking water treatment." Desalination, 328, 1-7.

Zheng et al., (2018) "Membrane fouling mechanism of biofilm-membrane bioreactor (BF-MBR): Pore blocking model and membrane cleaning" Bioresouce Technology, https://doi.org/10.1016/j.biortech.2017.11.036. 8 pages.

Zhou C. , A. Ontiveros-Valencia, R. Nerenberg, Y. Tang, D. Friese, R. Krajmalnik-Brown, B. Rittmann, (2019) "Hydrogenotrophic Microbial Reduction of Oxyanions with the Membrane Biofilm Reactor," FrontMicrobiol, 9 1-14.

Zhou, C, Wang, Z, Marcus, A.K. and Rittmann, B.E (2016) "Biofilm-enhanced continuous synthesis and stabilization of palladium nanoparticles PdNPsb" Environmental Science: Nano 3(6). 9 pages.

Zhou, Y, Huang, H. and Shen, D (2016) "Multi-substrate biodegradation interaction of I, 4-dioxane and BTEX mixtures byAcinetobacter baumannii DDI." Biodegradation 27(1), 37-46.

Ziv-El, M., Popat, S.C., Parameswaran, P., Kang, Dav. , Polasko, X, Halden, R.U., Rittmann, BE. and Krajmalnik-Brown, R. (2012) "Using electron balances and molecular techniques to assess trichoroethene -induced shifts to a dechlorinating microbial community." Biotechnology and Bioengineering 109(9), 2230-2239.

Ziv-El, M.; Popat, S. C.; Cai, K.; Halden, R. U.; Krajmalnik-Brown, R.; Rittmann, B. E. "Managing Methanogens and Homoacetogens to Promote Reductive Dechlorination of Trichloroethene with Direct Delivery of H2 in a Membrane Biofilm Reactor." Biotechnol. Bioeng. 2012, 109 (9), 2200-2210. https://doi.org/10.1002/bit_24487.

Ziv-El, NL, Delgado, A.G., Yao, Y, Kang, D.w., Nelson, Halden, R,U. and Krajmalnik-Brown, R. (2011) "Development and characterization of DehaloRA2, a novel anaerobic microbial consortium performing rapid dechlorination of TCE to ethene" Applied Microbiology and Biotechnology 92(5), 1063-1071.

* cited by examiner

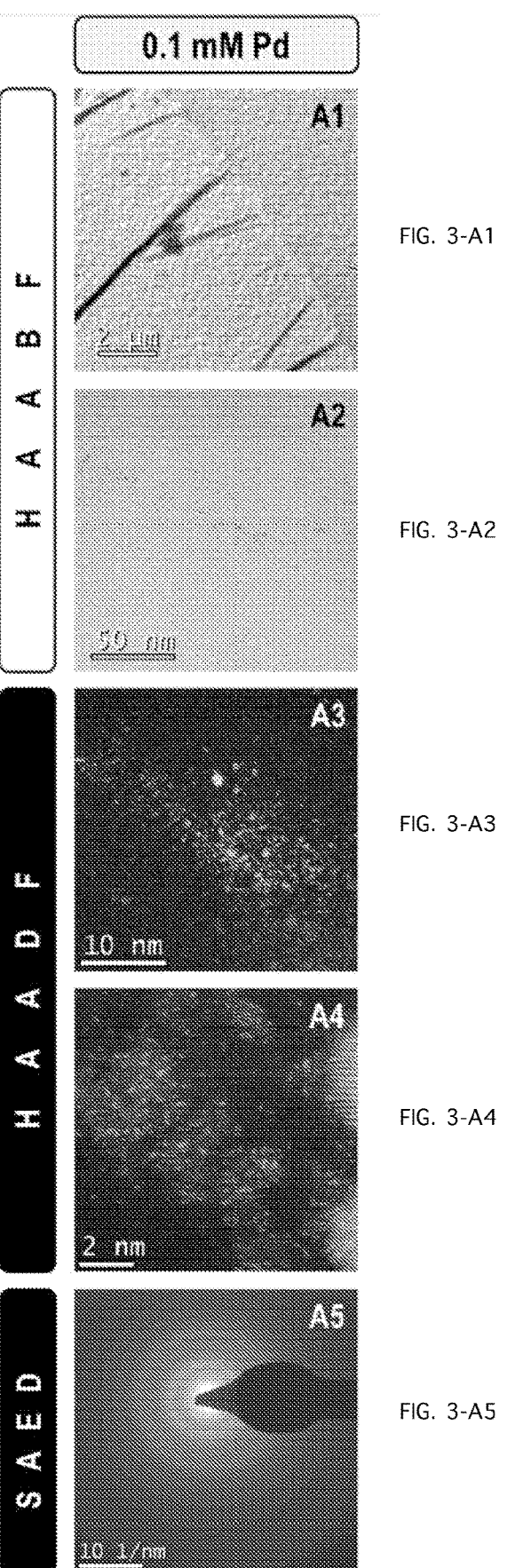
FIG. 3-A1
FIG. 3-A2
FIG. 3-A3
FIG. 3-A4
FIG. 3-A5

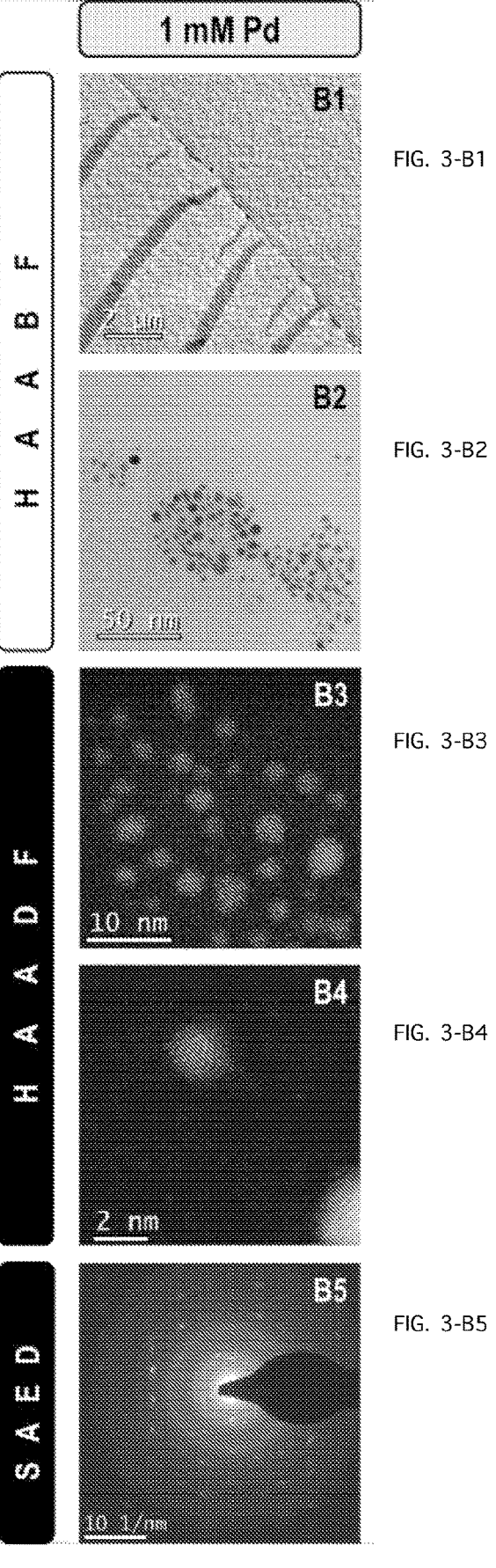
FIG. 3-B1
FIG. 3-B2
FIG. 3-B3
FIG. 3-B4
FIG. 3-B5

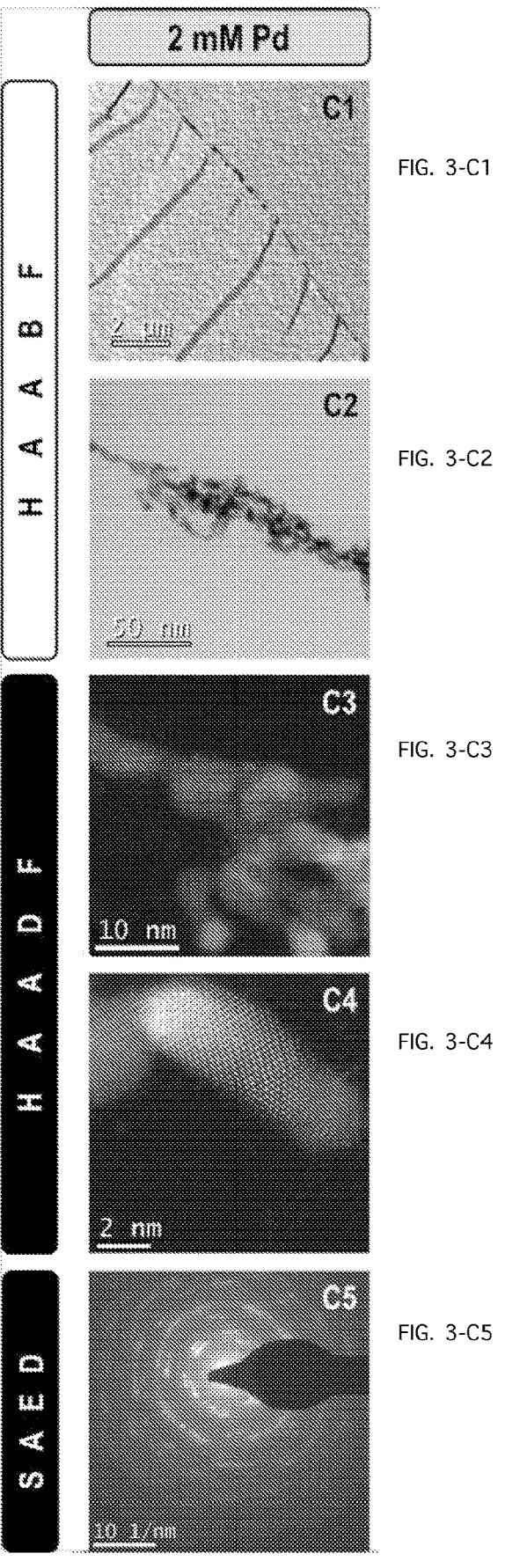
FIG. 3-C1
FIG. 3-C2
FIG. 3-C3
FIG. 3-C4
FIG. 3-C5

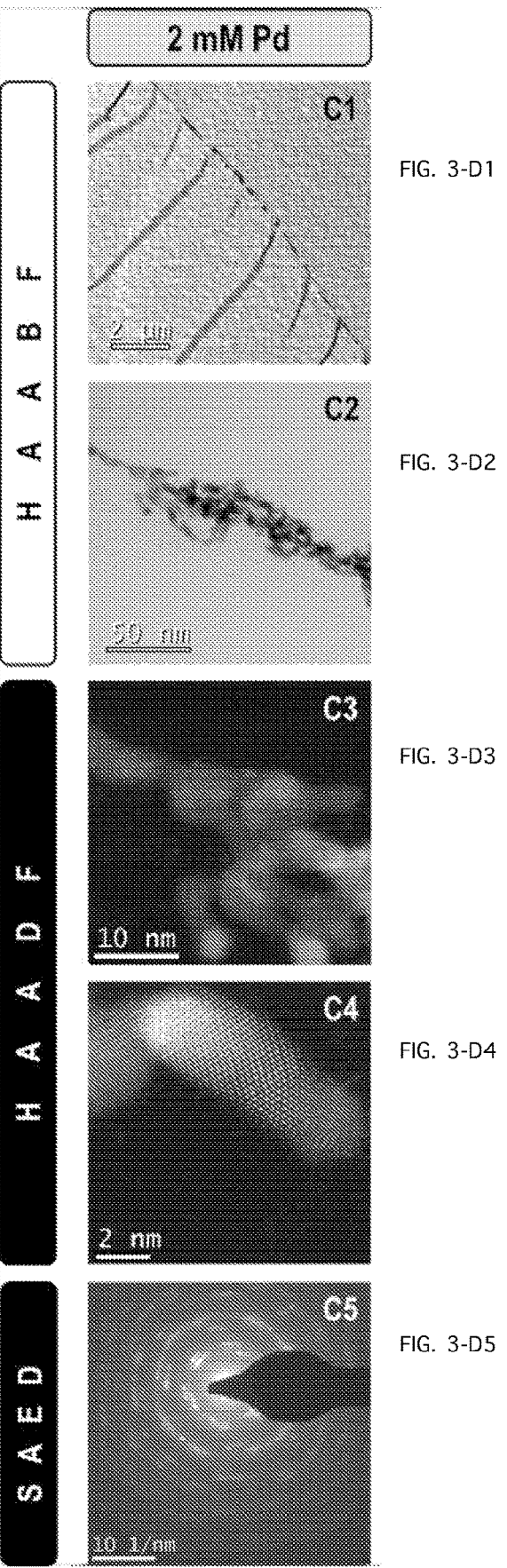
FIG. 3-D1
FIG. 3-D2
FIG. 3-D3
FIG. 3-D4
FIG. 3-D5

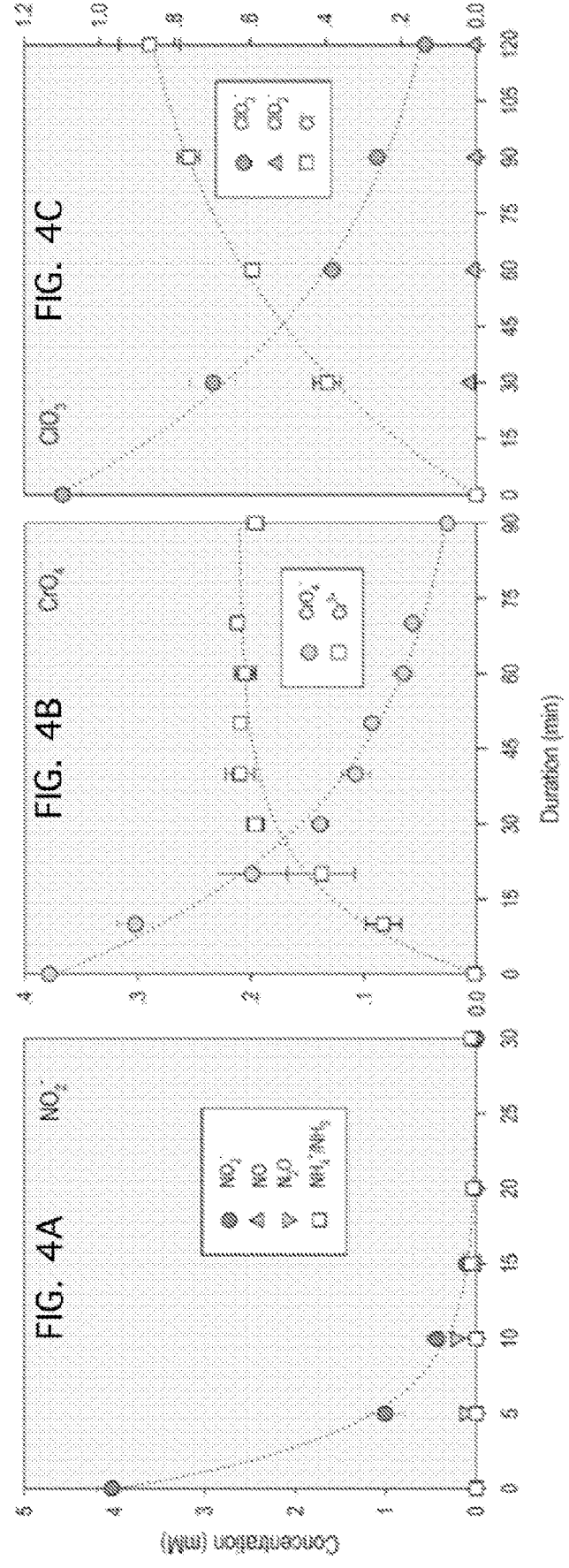

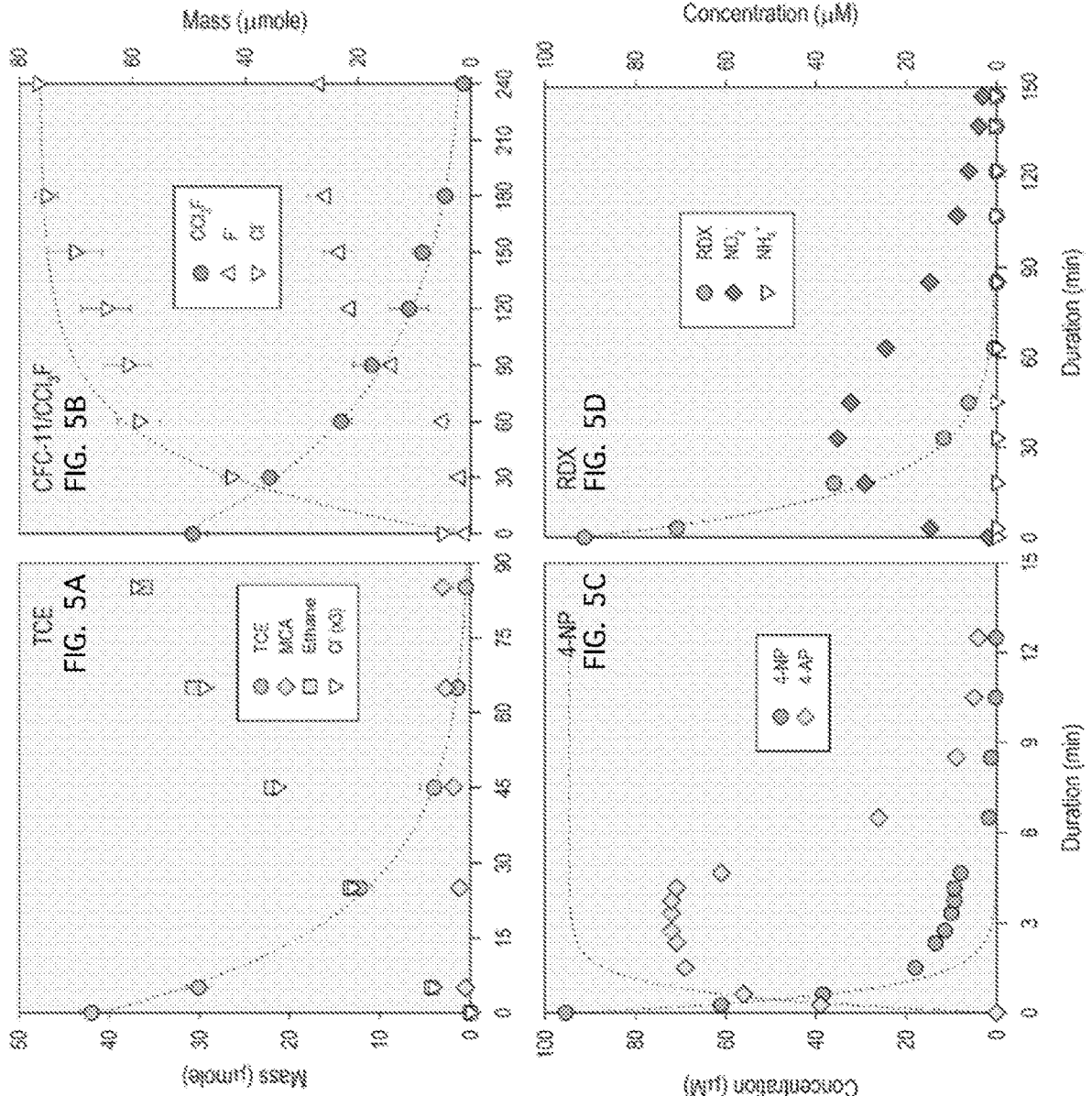

SYSTEMS FOR CATALYTICALLY REMOVING OXIDIZED CONTAMINANTS FROM A FLUID AND RELATED METHODS

CROSS-REFERENCE TO RELATED APPLICATIONS

This application is a national stage application, filed under 35 U.S.C. § 371, of International Patent Application No. PCT/US2021/037959, filed on Jun. 17, 2021, which claims the benefit of and priority to U.S. provisional patent application 63/040,513, filed Jun. 17, 2020, the entirety of the disclosure of which is hereby incorporated by this reference thereto.

FIELD OF THE INVENTION

The invention relates to systems and methods for removing oxidized contaminants from water or wastewater.

BACKGROUND OF THE INVENTION

Precious metal-based catalysis has emerged as a promising strategy for efficiently promoting destruction of a wide spectrum of oxidized contaminants in water via $H_2$—, borohydride-, or formate-induced reduction in ambient conditions. Its practical applications for long-term continuous treatment of water and wastewater at large scales, however, have not been realized due to two crucial roadblocks.

First, most laboratory-scale tests of catalytic contaminant removal used precious-metal-based catalysts supported on micro-size activated carbon, metal oxides, silica, or polymeric dispersers (for example, polyvinyl pyrrolidone (PVP) and metal-organic frameworks (MOFs)). The coating of precious metal nanoparticles (NPs) onto these supporters requires high temperature and/or high pressure and thus is energy-consuming. In addition, NP synthesis and the NP coating are usually two distinct steps, which leads to a low yield of harvested catalysts. Often, only a small portion of the precursor or synthesized NPs can be retained on the supporter for subsequent catalytic applications. Furthermore, these precious metals/supporter catalysts are mostly suspended or fluidized evenly in liquid phase and, thus, subject to being washed out in continuous operation.

Second, only a few electron donors ($H_2$, formate, and borohydride) are able to drive reduction reactions catalyzed by precious metals. $H_2$ is advantageous compared to the other two electron donors, because it is nontoxic, does not generate any secondary contamination or carbon footprint, and can be readily obtained at a reasonable cost. However, $H_2$ has low-solubility gas diffusion, which means that its diffusion through gas-liquid interfaces and then to the catalytic surface significantly slows the catalytic reaction. From a practical perspective, conventional gas transfer approaches, which involve bubbling, are not feasible at full-scale applications due to the significantly high cost (reflected by wasting of $H_2$ and energy) and off-gassing of combustible $H_2$.

Accordingly, systems and methods that can overcome the roadblocks of using precious metal-based catalysis to remove contaminants are needed.

SUMMARY OF THE INVENTION

The disclosure relates to methods related to the removal of oxidized contaminants water or wastewater via precious metal-based catalysis and to systems for the practice of such methods. In some aspects, the disclosure also relates to methods and systems for synthesizing precious metal nanocatalysts.

In some aspects, a method for establishing a catalyst film for long-term removal of oxidized contaminants from a fluid is disclosed. The method comprises providing a non-porous gas transfer membrane. The non-porous gas transfer membrane comprises a gas-phase side and a liquid-phase side. The method further comprises contacting the liquid-phase side of the non-porous gas transfer membrane with a precious metal medium and contacting the gas-phase side of the non-porous gas transfer membrane with hydrogen ($H_2$) gas at a sufficient partial pressure to convert at least 90% of the precious metal salt in the precious metal medium to elemental form. The precious metal medium comprising a precious metal salt and a solvent. The elemental form of the precious metal is in the form of a nanoparticle and is deposed on the liquid-phase side of the non-porous gas transfer membrane. In particular embodiments, the mean diameter of the precious metal nanoparticles is less than 5 nm.

In other aspects, a method for removing oxidized contaminants from a fluid is disclosed. The method comprises establishing a catalyst film comprising precious metal nanoparticles on a non-porous gas transfer membrane; contacting a fluid containing oxidized contaminant to the catalyst film; and contacting the catalyst film with $H_2$ gas, wherein the precious metal nanoparticles reduce the oxidized contaminants and the $H_2$ gas is provided at a sufficient partial pressure to reduce the oxidized contaminants.

In yet other aspects, a system for removing oxidized contaminants from a fluid is described. The system comprises a non-porous gas transfer membrane, a catalyst film comprising precious metal nanoparticles, and a $H_2$ gas source. The catalyst film is deposed on the non-porous gas transfer membrane. The precious metal nanoparticles and the hydrogen gas catalyze the reduction of oxidized contaminants. The catalyst film is deposed on the liquid-phase side of the gas transfer membrane, and the $H_2$ gas source delivers $H_2$ gas to the gas-phase side of the gas transfer membrane.

In some aspects, the catalyst film consists of precious metal nanoparticles. In particular embodiments, the catalyst film consists of precious metal nanoparticles with a mean diameter of less than 5 nm.

BRIEF DESCRIPTION OF THE DRAWINGS

FIGS. 3-A1 to 3-A5 depict, in accordance with certain embodiments, scanning transmission electron microscopy (STEM) images of Pd-films coated on the membranes 0.1 mM $Na_2PdCl_4$ as the precursor.

FIGS. 3-B1 to 3-B5 depict, in accordance with certain embodiments, STEM images of $Pd^0$-films coated on the membranes 1 mM $Na_2PdCl_4$ as the precursor.

FIGS. 3-C1 to 3-C5 depict, in accordance with certain embodiments, STEM images of $Pd^0$-films coated on the membranes 2 mM $Na_2PdCl_4$ as the precursor.

FIGS. 3-D1 to 3-D5 depict, in accordance with certain embodiments, STEM images of $Pd^0$-films coated on the membranes 5 mM $Na_2PdCl_4$ as the precursor.

FIG. 4 depicts, in accordance with certain embodiments, the reduction of nitrite catalyzed by Pd-film (0.1 mM Pd precursor) in $H_2$-MCfRs (left), the reduction of chromate catalyzed by Pd-film (0.1 mM Pd precursor) in $H_2$-MCfRs (middle), and the reduction of chlorate catalyzed by Pd-film (0.1 mM Pd precursor) in $H_2$-MCfRs (right).

FIGS. 5A-5D depict, in accordance with certain embodiments, reduction of trichloroethane (TCA) catalyzed by Pd-film in a MCfR (FIG. 5A), reduction of trichlorofluroroethane (CFC-11) catalyzed by Pd-film in a MCfR (FIG. 5B), reduction of 4-nitrophenol (4-NP) catalyzed by Pd-film in a MCfR (FIG. 5C), and reduction of 1,3,5-trinitroperhydro-1,3,5-triazine (RDX) catalyzed by Pd-film in a MCfR (FIG. 5D).

FIGS. 9A and 9B show the morphology of cross sections of the Pd/Rh film (images from transmission electron microscopy). FIGS. 9C and 9D show diffraction patterns from electron energy loss spectroscopy, which show $Pd^0$ and $Rh^0$ are located on different planes of the catalyst film.

DETAILED DESCRIPTION OF THE INVENTION

Figure 1:
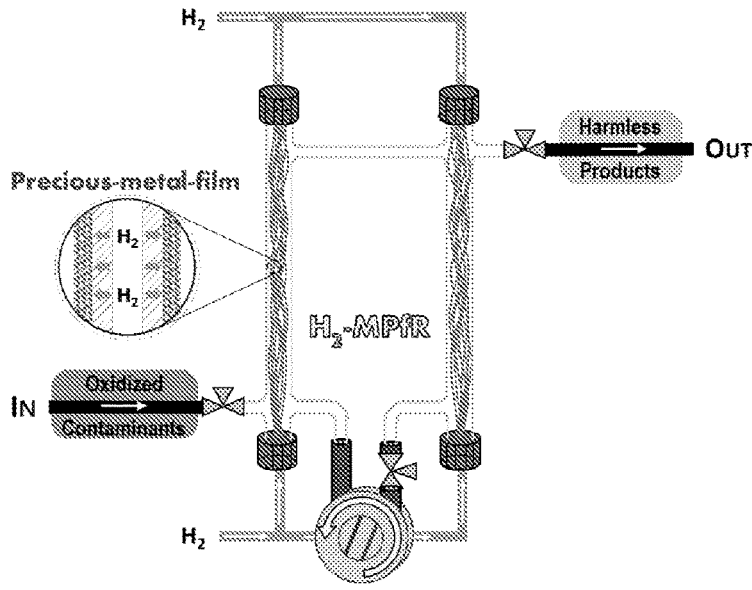
FIG. 1 illustrates, in accordance with certain embodiments, a schematic of a bench-scale form of the catalytic reactor (also referred to herein as $H_2$-MCfR).

Detailed aspects and applications of the invention are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. It should be noted that there are many different and alternative configurations, devices, and technologies to which the disclosed inventions may be applied. The full scope of the inventions is not limited to the examples that are described below.

The singular forms "a," "an," and "the" include plural referents unless the context clearly dictates otherwise. Thus, for example, reference to "a step" includes reference to one or more of such steps.

The term "about" when used in the context of numeric values denotes an interval of accuracy that is familiar and acceptable to a person skilled in the art. The interval is +10% of the given numeric value, +5% of the given numeric value, or +2% of the given numeric value.

As used herein, the term "precious metal" refers to gold (Au), silver (Ag), and platinum group metals (PGM). The members of PGM include platinum (Pt), palladium (Pd), ruthenium (Ru), rhodium (Rh), osmium (Os), and iridium (Ir).

As used herein, the terms "precious metal-film" and "catalyst film" refer to a film of precious metal nanocatalysts.

Disclosed herein is an innovative technology that features a sustainable nanoparticle support for catalytic reduction of oxidized contaminants to remove these contaminants from a fluid. The catalytic reactor system ($H_2$-MCfR) described herein have minimal catalyst loss and efficient gas delivery for maximal $H_2$ utilization. Accordingly, the disclosure also relates to methods for removing at least one oxidized contaminant from a fluid. The oxidized contaminants that can be removed by the disclosed system methods include herbicides, pesticides, disinfection byproduct, solvents, freon, explosives, and precursors or raw materials, for example, nitrite, chromate, and trichloroethene. In particular embodiments, the catalytic reactor system reduces at least one oxidized contaminant selected from the group consisting of chlorophenols, 2,4-dichlorophenoxyacetic acid, 3,6-dichloro-2-methoxybenzoic acid, 1-chloro-3-ethylamino-5-isopropylamino-2,4,6-triazine, 3,5-dibromo-4-hydroxybenzonitrile, trichloroacetic acid, trichloroacetonitrile, NDMA, bromochloroiodomethane, trichloroethane, trichloroethene, chloroform, CFC-11, CFC-12, CFC-113, phenol, nitrophenols, PFAS, 1,3,5-Trinitro-1,3,5-triazinane, 1,3,5,7-Tetranitro-1,3,5,7-tetrazoctane, and TNT.

Compared to biological systems for treating oxidized contaminants, the catalytic reactor system described herein does not have a lag phase, is more stable, has no issues with fouling, and is more resistant against sudden changes of operational conditions. Additionally, no addition of organic electron donors, which may cause secondary contamination, are needed. The catalytic reactor system has significantly faster removal of organic contaminants compared to biological systems for treating oxidized contaminants.

Compared to other catalytic systems for treating oxidized contaminants, the disclosed catalytic reactor system enables one-pot synthesis and does not require high temperatures or pressures. Accordingly, the energy and resource costs for the synthesis of catalysts are less for the catalytic reactor system described herein. The utilization of precursors in the disclosed catalytic reactor system is over 99%. The disclosed catalytic reactor system also treats a wider spectrum of contaminants than catalytic systems of the prior art. As shown in the example, the catalytic system described herein is suitable for long-term continuous treatment, as it has minimal catalyst loss and constantly high catalytic activity.

Catalytic Reactor System

The catalytic reactor system comprises a film of precious metal nanoparticles (the catalyst film), a gas transfer membrane on which the film of precious metal nanoparticles is deposed, and a hydrogen-gas source. In some embodiments, the gas transfer membrane is nonporous. $H_2$ gas is delivered to the lumen at a carefully controlled pressure, and the H2 diffuses through the walls in a bubbleless form. The $H_2$ gas functions as the electron donor to drive autocatalytic reduction of the soluble precious metals (with an oxidation state of +2 or +3) to elemental precious metals (with an oxidation state of 0), which spontaneously deposit as nanoparticles on the membrane wall of the liquid-phase side. The $H_2$ gas also facilitates the reduction of oxidized contaminants by the precious metal nanoparticles. Accordingly, "precious metal nanocatalyst" as referenced herein refer to the film of precious metal nanoparticles deposed on the gas transfer membrane. A bench-scale example of this system is shown in FIG. 1.

In particular embodiments, the catalyst film is spontaneously formed on the liquid-phase side of the gas transfer membrane, for example, the member's outer surfaces, which would be the liquid-phase side. The liquid-phase side of the gas transfer membrane is in fluid contact with the liquid containing precious metal contaminants or a precious metal medium. For example, dissolved Pd(II) in the precious metal medium is autocatalytically reduced by the $H_2$ gas provided by the hydrogen-gas source to form $Pd^0$ nanoparticles (NPs) that are simultaneously deposited on the gas transfer membrane as a $Pd^0$-film. The $Pd^0$-film is capable of catalyzing the oxidation of the $H_2$ coupled to reduction of the oxidized contaminants in the bulk liquid. As another non-limiting example, a precious metal medium containing dissolved Pd(II) and Rh(III) is contacted to the liquid-phase side of the gas transfer membrane, and the $H_2$ gas provided by the hydrogen-gas source facilitates the reduction of Pd(II) and Rh(III) to $Pd^0$ and $Rh^0$. The $Pd^0$ and $Rh^0$ nanoparticles are simultaneously deposited on the gas transfer membrane as a Pd/Rh-film.

Thus, described herein is a method of producing the catalyst film. The method comprises providing an aqueous system in contact with a nonporous gas transfer membrane; submerging the nonporous gas transfer membrane in a precious metal medium; and pressurizing the gas-phase side of the membrane with $H_2$ at desired partial pressure, wherein precious metal nanoparticles are formed and coated on the nonporous gas transfer membrane to form a catalyst film. Thus, in some aspects, the catalyst film consists of precious metal nanoparticles. In certain embodiments, the catalyst film consists of nanoparticles of one type of precious metal, which is also referred to herein as a monometallic catalyst film. In other embodiments, the catalyst film consists of nanoparticles of two types of precious metals, which is also referred to herein as a bimetallic catalyst film.

In some aspects, the method comprises contacting the liquid-phase side of the gas transfer membrane with a precious metal medium. Meanwhile, the gas-phase side of the non-porous gas transfer membrane is contacted with $H_2$ gas at a sufficient partial pressure to convert at least 90% of the precious metal salt in the precious metal medium to elemental form. In some aspects, at least 99% of the precious metal salt in the precious metal medium is converted to elemental form. In particular implementations, at least 90% of the precious metal salt in the precious metal medium is converted to elemental form within 150 minutes of contact with the precious metal medium and $H_2$ gas. In certain implementations, at least 90% of the precious metal salt in the precious metal medium is converted to elemental form within 110 minutes of contact with the precious metal medium and $H_2$ gas. In some aspects, at least 99% of the precious metal salt in the precious metal medium is converted to elemental form within 150 minutes of contact with the precious metal medium and $H_2$ gas. In a particular embodiment, at least 99% of the precious metal salt in the precious metal medium to is converted elemental form within 110 minutes of contact with the precious metal medium and $H_2$ gas. In certain embodiments, the elemental form of the precious metal are nanoparticles with a mean diameter of less than 5 nm, less than 4 nm, less than 3 nm, less than 2 nm, less than 1 nm, less than 0.5 nm, or between 0.3 nm and 0.4 nm. In some embodiments, the precious metal nanoparticles have diameters of less than 10 nm, for example, less than 9 nm, less than 8 nm, less than 7 nm, less than 6 nm, less 5 nm, less than 4 nm, less than 3 nm, less than 2 nm, less than 1 nm, less than 0.5 nm, or between 0.3 nm and 0.4 nm. In some aspects, the nanoparticles agglomerate to form nanoclusters, which have diameters of less than 10 nm, for example, less than 9 nm, less than 8 nm, less than 7 nm, less than 6 nm, less 5 nm, less than 4 nm, less than 3 nm, or less than 2 nm. Accordingly, in certain implementations, the catalyst film consists of precious metal nanoparticles with diameters of less than 10 nm, for example, with a mean diameter of less than about 10 nm, less than about 9 nm, less than about 8 nm, less than about 7 nm, less than about 6 nm, less than about 5 nm, less than about 4 nm, less than 3 nm, less than 2 nm, less than 1 nm, less than 0.5 nm, or between 0.3 nm and 0.4 nm. In some aspects, the catalyst film consists of precious metal nanoparticles with a mean diameter of less than 5.5 nm, less than 5.25 nm, less 5 nm, less than 4.5 nm, less than 4.25 nm, less than 4 nm, less than 3.5 nm, less than 3.25 nm, less than 3 nm, less than 2.5 nm, less than 2.25 nm, less than 2 nm, less than 1.5 nm, less than 1.25 nm, less than 1 nm, less than 0.5 nm, less than 0.4 nm, or between 0.3 nm and 0.4 nm. In certain embodiments, the catalyst film comprises nanoclusters having diameters of less than 10 nm, for example, less than 9 nm, less than 8 nm, less than 7 nm, less than 6 nm, less 5 nm, less than 4 nm, less than 3 nm, or less than 2 nm.

In some aspects, the loading density of the catalyst film is between 5 mg and 12 g precious metal/$m^2$. For example, in certain embodiments, the loading density of a monometallic catalyst film is about 0.07 mmol Pd/$m^2$ (about 7.7 mg Pd/$m^2$) or 0.07±0.007 mmol Pd/$m^2$ (7.7±0.08 mg Pd/$m^2$). In other embodiments, the loading density of a bimetallic catalyst film is about 12 mg precious metal/$m^2$ or between 11 mg precious metal/$m^2$ to 11.5 mg precious metal/$m^2$. For example, the loading density of a Pd/Rh-film is 11.2 g precious metal/$m^2$, in particularly 5.6 g Pd/$m^2$ and 5.6 g Rh/$m^2$.

Accordingly, in certain embodiments, the catalytic reactor system further comprises a precious metal medium, which comprises at least one precious metal salt in a solvent. The precious metal medium provides the charged precious metal ions for the formation of the catalyst film on the gas transfer membrane. In some aspects, the precious metal medium the liquid containing precious metal contaminants, for example liquid from a waste stream that comprises precious metal contaminants.

The operational conditions of the catalytic reactor system can be conveniently and accurately tuned for optimizing the conditions to reduce particular oxidized contaminants. For example, the selection of particular precious metal and their amount in the precious metal medium for the production of the catalyst film, the pH in the liquid comprising the oxidized contaminants or the precious metal medium, $H_2$ pressure, and surface-loading rate of the oxidized contaminant each may be adjusted to optimize conditions for catalytic reduction of certain oxidized contaminants.

a. Gas Transfer Membrane:

The gas transfer membrane used in the catalytic reactor system does not have pores in its wall (for example, a nonporous membrane). The lack of pores in the membrane enables transferring gas (for example, hydrogen) in a bubble-free form at controllable rates. In some embodiments, the membrane is a hollow-fiber membrane. In such embodiments, gas is supplied to the lumen of the hollow-fiber membrane (the gas-phase side). Accordingly, catalyst film would be anchored to the outer surface of the hollow-fiber membrane (the liquid-phase side). In other embodiments, the membrane is a flat- or curled-sheet membrane. In such embodiments, hydrogen gas is supplied to one side of the sheet membrane (the gas-phase side), while catalyst film is anchored to the other surface of the sheet membrane (the liquid-phase side).

The membrane may be made of a variety of polymeric materials, for example polypropylene, polyurethane, polysulfone, or composite forms. In certain embodiments, the thickness of the gas transfer membrane is may be 50-70 $\mu$m, for example between 50-55 $\mu$m.

In particular embodiments, the gas transfer membrane is a nonporous polypropylene hollow-fiber membrane (200 $\mu$m OD, 100-110 $\mu$m ID, wall thickness 50-55 $\mu$m).

b. Precious Metal Medium

Exemplary precious metals that could be used for producing the catalyst film include transition metal and post-transition metals. Example of transition metals that may be used to produce catalyst films include metals in the platinum metal group (which are ruthenium, rhodium, palladium, osmium, iridium, and platinum), copper, gold, silver, rhenium, molybdenum, wolframium, cobalt, and nickel. Examples of post-transition metals that may be used to produce catalyst films include tin, gallium, and indium.

The precious metal medium comprises a precious metal a solvent. The solvent in the precious metal medium is selected from at least one of water, salt solution, hydrochloric acid, methanol, ethanol, acetonitrile, toluene, dichloromethane, chloroform, or tetrahydrofuran. In certain implementations, the solvent is deionized water.

Precious metal salts rapidly dissolve in the solvent and release soluble precious metal ions. Soluble precious metal ions include $Au^{3+}$, $Ag^+$, $(PtCl_4)^{2+}$, $(PdCl_4)^{2+}$, $Rh^{3+}$, $Ru^{3+}$, $Ir^{4+}$, $Os^{4+}$, $Cu^{2+}$, $Sn^{2+}$, $Ni^{2+}$, $Mo^{6+}$, and $W^{6+}$. Accordingly, the precious metal medium comprises at least one precious metal ions selected from the group consisting of $Au^{3+}$, $Ag^+$, $(PtCl_4)^{2+}$, $(PdCl_4)^{2+}$, $Rh^{3+}$, $Ru^{3+}$, $Ir^{4+}$, $Os^{4+}$, $Cu^{2+}$, $Sn^{2+}$, $Ni^{2+}$, $Mo^{6+}$, and $W^{6+}$. Exemplary precious metal salts in the precious metal medium include gold chloride ($AuCl_3$), silver nitrate ($AgNO_3$), sodium tetrachloropalladate ($Na_2PtCl_4$), sodium tetrachloropalladate ($Na_2PdCl_4$), ruthenium chloride ($RhCl_3$), ruthenium chloride ($RuCl_3$), potassium hexachloroiridate ($K_2IrCl_6$), potassium hexachloroosmate ($K_2OsCl_6$), cupric chloride ($CuCl_2$), tin chloride ($SnCl_2$), nickel chloride ($NiCl_2$), molybdenum oxide ($MoO_3$), and sodium tungstate ($Na_2WO_4$).

The range of the concentration of the precious metal in the precious metal catalyst is wide, for example, 0.1-100 mM. In some aspects, the concentration of precious metal in the precious metal medium is 0.1-5 mM, for example 1-5 mM. In particular embodiments, the concentration of precious metal in the precious metal medium is about 0.1 mM, about 1 mM, about 2 mM, or about 5 mM. In some aspects, the concentration of precious metal in the precious metal medium is 0.1±0.01 mM, 1±0.1 mM, 2±0.2 mM, or 5±0.05 mM. In other aspects, the concentration of precious metal in the precious metal medium is 0.1±0.005 mM, 1±0.05 mM, 2±0.1 mM, or 5±0.025 mM.

In some embodiments, the precious metal medium further comprises an acid, abase, and/or pH buffers. The acid may be hydrochloric acid. The base may be sodium hydroxide. In particular embodiments, the pH buffer adjusts the pH of the precious metal medium to anywhere in the range of 0 and 14. In certain embodiments, the pH of the precious metal medium is between 3 and 10, for example, a pH of 3-8, 3.5-7.5, 6.5-8.5, or about 7. In some aspects, the pH of the precious metal medium is 7±0.5, 7±0.4, 7±0.3, 7±0.2, 7±0.1, or 7±0.05.

e. Hydrogen Gas Source

The hydrogen gas source can be any reliable source of $H_2$ gas, for examples, a gas storage tank having pressurized $H_2$ gas, a $H_2$ generator via water electrolysis, or a methane reformer. In some embodiments, the $H_2$ purity is over 99%. In other embodiments, the $H_2$-gas source include a built-in or external gas pressure regulator. The gas pressure regulator regulates the pressure of $H_2$ gas from the gas storage tank to the gas-phase side of the membrane. In particular implementations, the gas pressure regulator regulates the pressure of $H_2$ gas so that $H_2$ gas is delivered to the gas-phase side of the membrane at no more than about 30 psig, for example, 3-30 psig, 5-30 psig, 2-15 psig, 2.5-15 psig, 2-10 psig, between about 3 psig and about 9 psig, or at about 10 psig. In some embodiments, the gas pressure regulator regulates the pressure of $H_2$ gas so that $H_2$ gas is delivered to the gas-phase side of the membrane at a partial pressure of 2.7-9.9 psig, 10±1 psig, 10±0.5 psig, or 10±0.25 psig.

In some aspects, the partial pressure of $H_2$ gas provided that is sufficient to convert at least 90% of the precious metal salt in the precious metal medium to elemental form within 150 minutes of contact with the precious metal medium and $H_2$ gas is about 10 psig, for example, 10±1 psig, 10±0.5 psig, or 10±0.25 psig.

In some aspects, the partial pressure of $H_2$ gas provided to the catalytic reactor system is between 2 psig and 20 psig. In certain implementations, the partial pressure of $H_2$ gas provided to the gas transfer membrane for reducing oxidized contaminants is between about 3 psig and about 5 psig, for example, about 3 psig, 3±0.3 psig, about 4 psig, 4±0.4 psig, or about 5 psig or 5±0.5 psig. In some implementations, the partial pressure of $H_2$ gas provided for forming a monometallic catalyst film is between 2 psig and 10 psig, between about 3 psig and about 9 psig or 2.7-9.9 psig. In some implementations, the partial pressure of $H_2$ gas provided for forming a bimetallic catalyst film and for reducing oxidized contaminants is between 10 psig and 20 psig.

Methods of Removing Oxidized Contaminants from a Fluid

The described methods of removing oxidized contaminants from a fluid comprises catalytically converting the contaminants into harmless or readily biodegradable forms. In some aspects, the methods of catalytically reducing oxidized contaminants described herein do not result in catalyst loss. The method comprises providing a fluid comprising an oxidized contaminant to the catalyst film, where the catalyst film reduces the oxidized contaminant. In some implementations, the method comprises tuning operational conditions of the catalytic reactor system to optimize treatment efficiency (for example, maximizing the contaminant removal rate and minimizing undesired products). In some aspects, the operational conditions are adjusted to ensure there is little to no catalyst loss.

In particular implementations, method comprises establishing a catalyst film comprising precious metal nanoparticles; contacting a fluid containing oxidized contaminant to the catalyst film; and contacting the catalyst film with hydrogen ($H_2$) gas. The precious metal nanoparticles reduce the oxidized contaminants and the $H_2$ gas is provided at a sufficient partial pressure to reduce the oxidized contaminants. In some aspects, the fluid containing the oxidized contaminants is water or wastewater.

As shown in the examples, the optimal partial pressure of $H_2$ gas provided reduce a large variety of oxidized contaminants via a monometallic catalyst film is 2-10 psig, between about 3 psig and about 9 psig, 2.7-9.9 psig, between about 3 psig and about 5 psig, for example, about 3 psig, 3±0.3 psig, about 4 psig, 4±0.4 psig, or about 5 psig or 5±0.5 psig.

Illustrative, Non-Limiting Examples in Accordance with Certain Embodiments

The disclosure is further illustrated by the following examples that should not be construed as limiting. The contents of all references, patents, and published patent applications cited throughout this application, as well as the figures, are incorporated herein by reference in their entirety for all purposes.

1. Activation of MCfR: Forming $Pd^0$-Film

A bench-scale MCfR featuring monometallic a $Pd^0$-film was prepared in ambient conditions (23° C. and 1 atm). The MCfR was of the same dual-tube design as shown in FIG. 1. The working volume of the MCfR was 60 mL. One bundle of 60 25-cm polypropylene fibers was installed in each of the dual tubes, giving a total membrane surface of 190 cm². The liquid phase of the MCfR was filled with $Pd^{2+}$ medium. The $Pd^{2+}$ medium contains 600 mg/L sodium tetrachloropalladate ($Na_2PdCl_4$; i.e., 2.0 mM soluble Pd(II)) as the precursor. The pH of the medium was adjusted to 7. $H_2$ was supplied from a pure-$H_2$ tank at a constant partial pressure of 10 psig.

Figure 2:
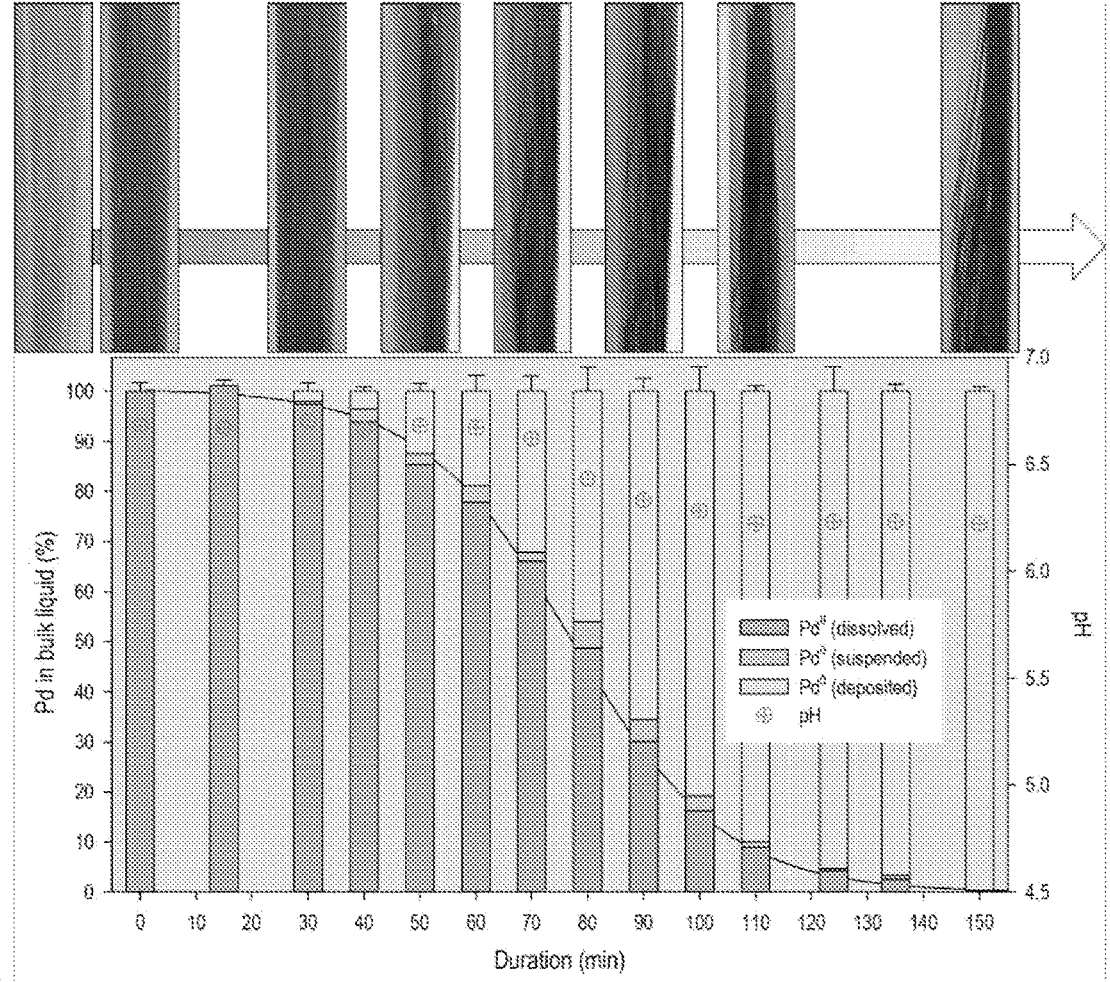
FIG. 2 depicts, in accordance with certain embodiments, autocatalytic monometallic palladium nanoparticles synthesis and coating on the nonporous polypropylene hollow fiber membranes in the membrane catalyst film reactor (MCfR). The upper portion depicts photos of the fiber section in one MCfR glass tube over time. The lower portion depicts the average percentage profile of palladium species over time in the MCfR.

FIG. 2 shows photos of a fiber section and the concentration profile of the Pd species over time in one MCfR. The first 40 minutes involved nucleation, and only 6% of the soluble Pd(II) was reduced to insoluble $Pd^0$. By eighty minutes, more than one-half of the total added Pd(II) was deposited on the fiber surface at $Pd^0$, turning the fibers' color from white to greyish-black. Then, Pd(II) reduction accelerated, with more than 99% of the total Pd converted to $Pd^0$ by 110 minutes, and the fibers turned dark black, since the reduced $Pd^0$ solids were deposited onto the fiber surface. Full reduction to $Pd^0$ and its deposition on the fibers were further confirmed by the minimal concentrations of insoluble Pd in the liquid samples. This rapid autocatalytic synthesis of metallic $Pd^0$ had a >99.7% yield, spontaneously coating 11.2 g Pd/m² on membranes within 150 minutes.

Other dose concentrations (0.1 mM, 1 mM, and 5 mM) of $Na_2PdCl_4$ as the precursor also were tested. The $Pd^0$ synthesis follow the similar kinetic pattern with the similar >99% yield. FIGS. 3-A1 to 3-D5 show scanning transmission electron microscopy (STEM) images using a range of magnifications of these $Pd^0$-films. In general, all the $Pd^0$ anchored on the membranes were nanoparticles of ≤5 nm.

2. Application of MCfR: Destruction of Oxyanions with $Pd^0$-Films

Precious metal-films in the $H_2$-MCfR system are able to catalyze reduction of a variety of oxyanions. These oxyanions include but are not limited to: nitrate ($NO_3^-$), nitrite ($NO_2^-$), perchlorate ($ClO_4^-$), chlorate ($ClO_3^-$), selenate ($SeO_4^{2-}$), selenite ($SeO_3^{2-}$), arsenate ($AsO_4^{3-}$), antimonate ($Sb_2O_7^{4-}/SbO_4^{3-}$), vanadate ($V_2O_7/VO_4^{3-}$), chromate ($Cr_2O_7^{2-}/CrO_4^{2-}$), molybdate ($Mo_2O_7^{2-}/MoO_4^{2-}$), tungstate ($W_2O_7^{2-}/WO_4^{2-}$), and perrhenate ($ReO^{4-}/ReO_5^{3-}$).

FIGS. 4A-4C present selected examples for nitrite reduction (4A), chromate reduction (4B), and chlorate reduction (4C) catalyzed by 0.56 g/m₂ $Pd^0$-film (0.1 mM Pd precursor) in the $H_2$-MCfR.

As shown in FIG. 4A, over 90% of the initial 4 mM (56 mg-N/L) $NO_2^-$ was rapidly removed (within 10 minutes), and the $NO_2^-$ concentration dropped below the MCL (1 mg-N/L) [10] within 15 minutes. The decrease in $NO_2^-$ concentration fit well to a pseudo-first-order decay model ($R^2$=0.989) with an observed catalytic activity of 25.8 $L \cdot g_{Pd}^{-1} \cdot min^{-1}$, a value similar to reported activities of suspended $Pd^0$ catalysts supported by metal oxides under optimal conditions (4.4-48 $L \cdot g_{Pd}^{-1} \cdot min^{-1}$). The rate was almost 100-fold faster than reported for PVP-supported Pd [13]. A transient, but inconsiderable accumulation of $N_2O$ (up to 5% of the total initial N) occurred during the first 10 minutes, followed by fast consumption within 5 minutes). Neither NO nor $NH^{4+}$ was detected throughout the 30-minute test, which gives >99.9% selectivity towards $N_2$, the desired product.

As shown in FIG. 4B, over 90% and 95% of the initial 0.4 mM (20 mg-Cr/L) $CrO_4^{2-}$ was immediately removed within 90 and 120 minutes, respectively. The $CrO_4^{2-}$ concentration eventually dropped below its MCL (0.1 mg-Cr/L) within 150 minutes. The decrease in $CrO_4^{2-}$ concentration fit well to a pseudo-first-order decay model ($R_2$=0.991), with an observed catalytic activity rate of 3.0 $L \cdot g_{Pd}^{-1} \cdot min^{-1}$. The rate was slightly lower than the highest reported values for $H_2$-induced colloidal or $Al_2O_3$-supported Pd catalysts (3.6 and 6.7 $L \cdot g_{Pd}^{-1} \cdot min^{-1}$, respectively). As expected, Cr(III), the product of $CrO_4^{2-}$ reduction, accumulated in the form of soluble $Cr^{3+}$ ion under acidic conditions.

Chemical reduction of $ClO_x^-$ species, though faster than microbial reduction, is still challenging due to a higher activation barrier for electron transfer than other oxyanions. Similar to $NO_3^-$, monometallic precious metals are not able to catalyze reduction of the most oxidized perchlorate ($ClO_4^-$), but the less oxidized $ClO_3^-$. Even for $ClO_3^-$ reduction, monometallic Pd has been proved not the optimal catalyst due to its low catalytic activity. In the basic $H_2$-MCfR featuring monometallic PdNPs, only 10% of the initial 1 mM $ClO_3^-$ was reduced during the first 120 minutes. The $H_2$-MCfR was modified by adding 0.1 mM perrhenic acid ($HReO_4$) prior to $ClO_3^-$ reduction. The soluble $ReO_4^-$ was first reduced to $Re_2O_5$, which was immobilized on the Pd surface. The $Re_2O_5$ then functioned as an electron shuttle to lower the activation energy for $ClO_3^-$ reduction. With the assistance of $Re_2O_5$, $ClO_3^-$ reduction reached 88% removal within 120 minutes (FIG. 4C). The resulting catalytic activity of 1.8 $L \cdot g_{Pd}^{-1} \cdot min^{-1}$ was close to the highest levels reported in previous studies using supported Pd—$ReO_x$, Rh, or Ru NPs in suspension. Along with $ClO_3^-$, we observed accumulation of no other less oxidized $ClO_x^-$, and free chloride ions ($Cl^-$) were >96% of the removed $ClO_3^-$, which confirms that $ClO_3^-$ was substantially reduced to $Cl^-$, the desired product.

3. Application of MCfR: Destruction of Organics with $Pd^0$-Films

Precious metal-film in the MCfR system is capable of catalyzing reduction of a variety of organics, for example, halogenated compounds, nitrated compounds, and unsaturated hydrocarbons.

FIGS. 5A-5D present selected examples of trichloroethene (TCE) dechlorination and saturation (5A), trichlorofluoroethane (CFC-11) dechlorination and defluorination (5B), 4-nitrophenol (4-NP) nitro-reduction (5C), and 1,3,5-Trinitroperhydro-1,3,5-triazine (RDX) denitration catalyzed by 0.56 g/m² Pd-film (0.1 mM Pd precursor) in the MCfR.

As shown in FIG. 5A, more than 99% of the initial 42 μmole TCE was removed with a pseudo-first-order catalytic activity of 5.4 $L \cdot g_{Pd}^{-1} \cdot min^{-1}$ ($R_2$=0.989), and 97% of the Cl in the initial TCE was released as Cl⁻ during the 85-minute test. The tests further confirm that, in addition to dechlorination, the membrane-supported PdNPs also were able to catalyze hydrogenation of unsaturated C=C bonds to saturated C—C bonds.

Among the possible reduced products from TCE, saturated monochloroethane (MCA; 17.4% selectivity) and ethane (82.6% selectivity) accumulated, while unsaturated dichloroethene (DCE, or $C_2H_2Cl_2$) and vinyl chloride (VC, or $C_2H_3Cl$) were not detected throughout the 85-minute test. This supports that hydrogenating saturation of the C=C bond (H addition) was prior to dechlorination (H replacement) in TCE.

As shown in FIG. 5B, over 90% and 95% of 50 µM CCl3F was removed within 3 and 4 hours, respectively, at a pseudo-first-order catalytic activity of 1.4 $L \cdot g_{Pd}^{-1} \cdot min^{-1}$ ($R_2 = 0.989$). The $CCl_3F$ dehalogenation rate in the MCfR at room temperature was faster than any CFC dehalogenation reported at higher temperatures (at least 75° C.; usually >300° C.) using noble metals, transient metals, or zeolite catalysts. F⁻ and Cl⁻ were released, eventually accounting for 42% and 45% of the total F and Cl in the initial CCl3F, respectively. This confirms that the membrane-supported PdNPs in the $H_2$-MCfR were capable of simultaneous dechlorination and defluorination of CFCs at ambient temperature.

As shown in FIG. 5C, 60% of the initial 96 µM 4-nitrophenol was rapidly removed within one-half minute. Extrapolating the half-minute data reveals a pseudo-first-order catalytic activity of 157 $L \cdot g_{pd}^{-1} \cdot min^{-1}$ ($R_2 = 0.98$), a value almost equal to the highest-ever-reported highest value (176.4 $L \cdot g_{Pd}^{-1} \cdot min^{-1}$) for carbon-composite-supported PdNP suspension. The main product was 56 µM 4-aminophenol (4-AP), accounting for 98% of the removed 4-CP, which confirms that the membrane-supported PdNPs in the $H_2$-MCfR was able to reduce nitro to amino functional groups around the C—N bond. As the reaction proceeded, 4-CP removal and 4-AP accumulation gradually slowed down. After 4 minutes, the 4-AP concentration started to drop. In the end of the 13-minute test, residual 4-AP was only 4 µM, and appearing was 89 µM of 4-aminocyclohexanone, the saturated counterpart of 4-AP. This supports a pattern of 4-NP destruction: C—N reduction followed by C=C saturation. Meanwhile, along with the 4-AP depletion, the retarded 4-nitrophenol removal recovered, reaching 99% and 99.9% within 8 and 12 minutes, respectively. This reveals a new possible trend that was not observed in the 4-CP test: the presence of 4-AP inhibited Pd-catalyzed 4-NP reduction, probably due to competition in adsorption sites. Loss of 4-AP eliminated the competition.

As shown in FIG. 5D, over 99.5% of the initial 91 µM RDX was removed within one hour at 22° C. and neutral pH. The pseudo-first-order catalytic activity was 6.9 $L \cdot g_{Pd}^{-1} \cdot min^{-1}$ ($R_2 = 0.994$), a catalytic reactivity considerably higher than most photocatalytic and ZVI/Fention processes and close to the recent $Bi/Fe^0$ or $Pd/Fe^0$ bimetallic processes. The residual concentration then dropped to below the detection limit (20 µg/L, close to EPA health advisory level) within 90 minutes. We also observed transient accumulation of $NO_2^-$, but no appearance of less nitrated cyclic intermediates; this indicates that the nitro functional group around the N—N bond in RDX was thoroughly denitrated, and the ring was further cleaved. In addition, the $NO_2^-$ consumption confirmed that PdNPs catalyzed subsequent $NO_2^-$ reduction, and absence of nitrous oxide ($N_2O$) and ammonium ($NH^{4+}$) confirms a nearly 100% selectivity towards $N_2$.

Table 1 summarizes the reaction pathways and products of Pd-film-catalyzed reduction of the organic contaminants described above as well as other representative organics that have been tested in the MCfR system. The list of the target contaminants in Table 1 is not exhaustive.

4. Application of MCfR: Operational Condition Controls for Optimizing Catalytic Activities and Product Selectivity FIGS. 6A-6H present the reduction of selected oxidized contaminants (nitrite, chlorite, TCE, and 4-CP) catalyzed by the Pd-film with variable conditions (catalyst type, catalyst dosage, pH, and $H_2$ pressure) that can be conveniently and accurately tuned in the MCfR system.

Figure 6A:
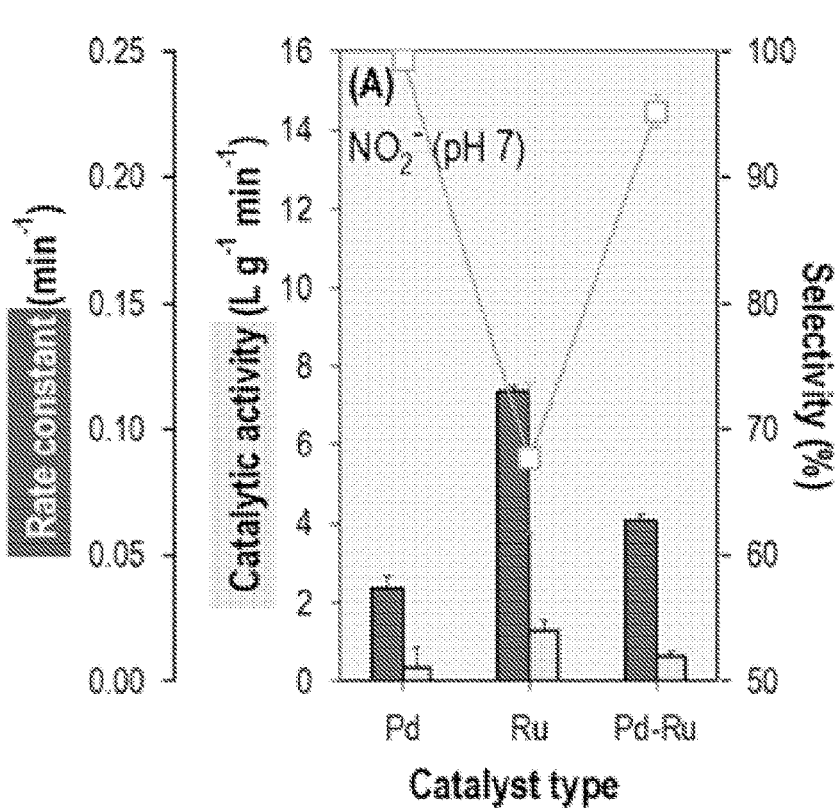
FIGS. 6A-6G depict, in accordance with certain embodiments, rate constants, catalytic activities, and product selectivities of Pd-film-catalyzed reductions of various oxidized contaminants in the MCfR.
Figure 6B:
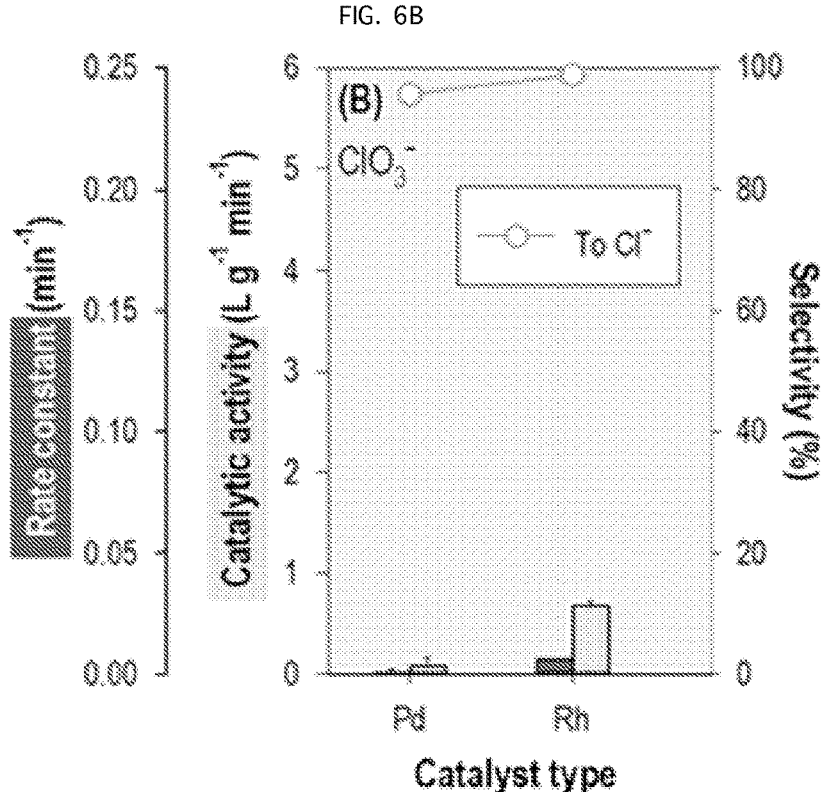

Different types of catalysts lead to distinct catalytic pattern and efficiency. For example, the catalytic activity of monometallic Rh for nitrite reduction is only ¼th of monometallic Pd-film, but the bimetallic Pd/Rh-film (at a molar ratio of 1:1) shows similar activity of monometallic Pd (FIG. 6A). The pure Pd-film is scarcely able to catalyze chlorate reduction (FIG. 6B).

Figure 6C:
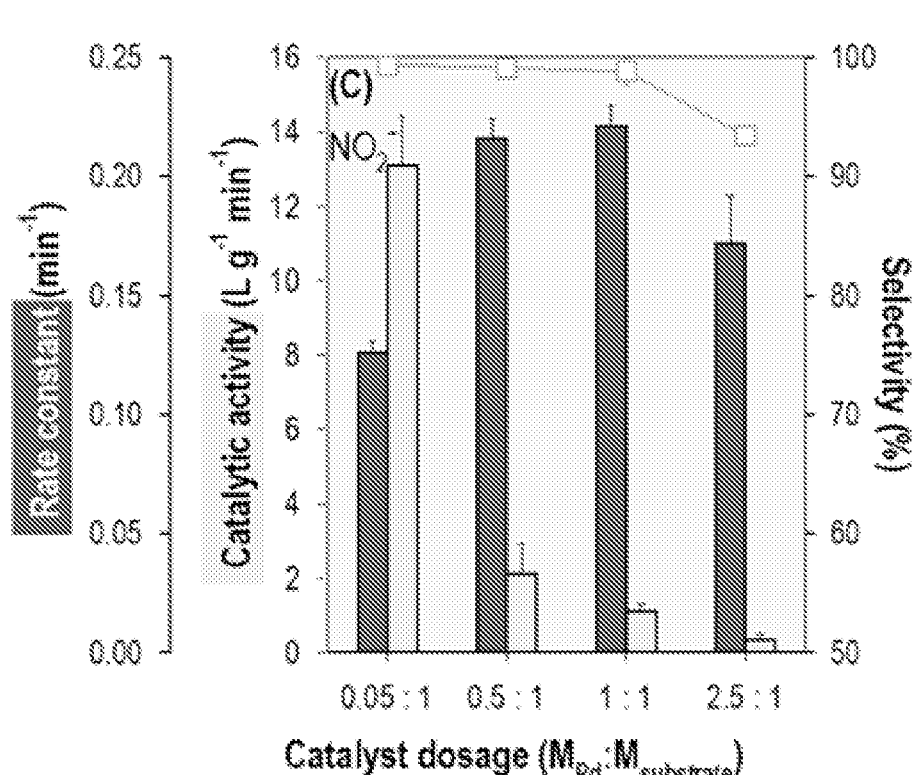
Figure 6D:
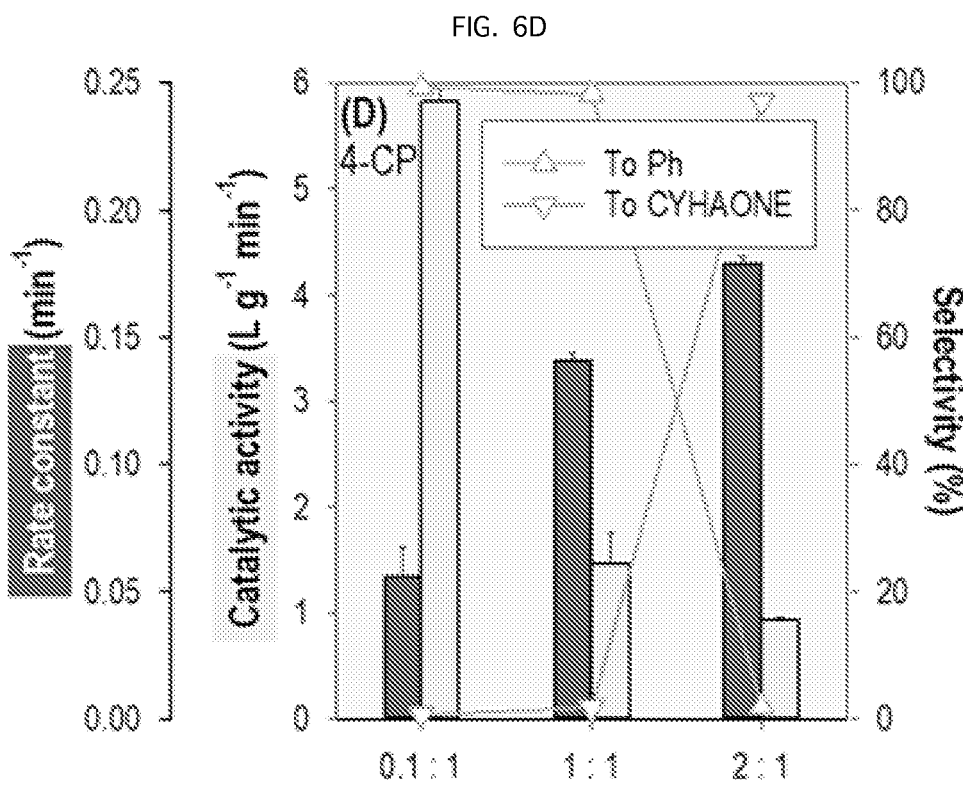

Increasing catalyst dosage enhances contaminant removal rate until a threshold is reached. The threshold, also known as the optimal dosage, yields the fastest contaminant removal and the highest catalytic activity. When the catalyst dosage beyond the optimal level, the contaminant removal remains, but the catalytic activity drops; this indicates redundancy of the catalysts. For example, when the Pd-to-nitrite molar ratio was increased from 1:1,000 to 1:400, the pseudo-first-order rate constant of nitrite reduction catalyzed by the Pd-film accordingly increased from 0.05 to 0.25 $min^{-1}$, and the catalytic activity increased from 15 to 25 L/g-Pd/min. When the Pd dosage further increased to 1:100, the rate constant slightly increased to 0.28 $min^{-1}$, while the catalytic activity dramatically dropped to 5 L/g-Pd/min (FIG. 6C). It can be concluded that the Pd-to-nitrite ratio of 1:400 was close to the optimal dosage for nitrite reduction catalyzed by the Pd-film in the MCfR system.

Catalyst dosage not only affects catalytic efficiency but also determines product selectivity. For example, when the molar ratio of Pd to 4-CP was 0.1:1, the product was exclusively phenol when the 4-CP removal reached 99% (FIG. 6D); this indicates that only dechlorination occurred. When the molar ratio of Pd to 4-CP was higher than 1:1, substantial products became the saturated cyclohexanol and phenol was inconsiderable at 99% 4-CP removal (FIG. 6D); this indicates ring saturation, driven by more abundant catalyst, also occurred along with dechlorination. Under this scenario, specific catalyst dosage is designed in order to maximize the catalytic selectivity towards a certain desired product.

Figure 6E:
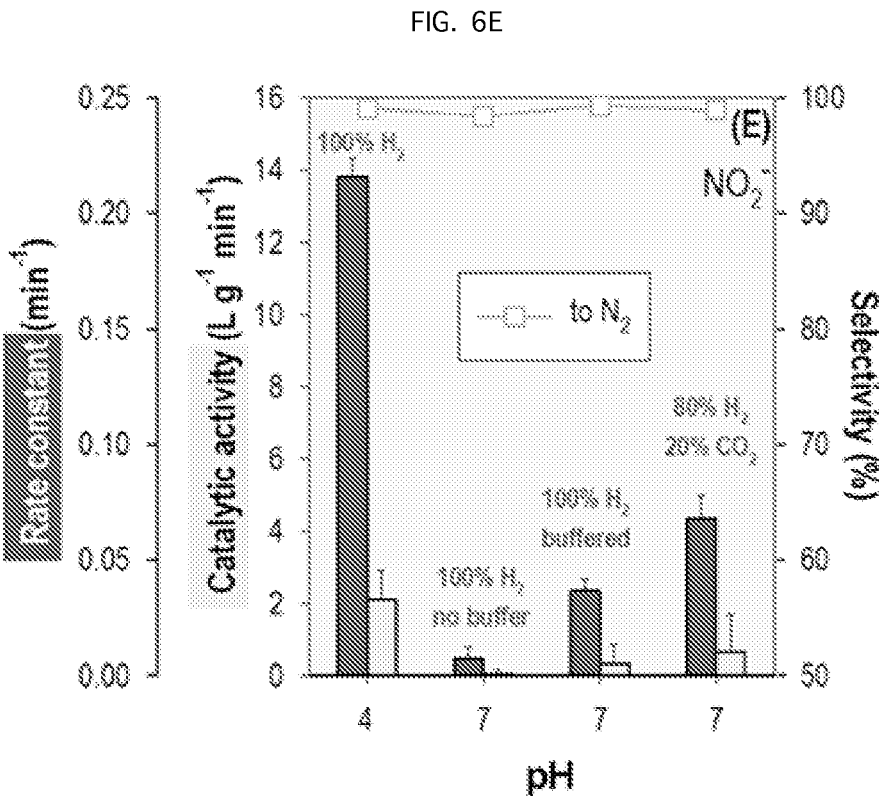

Catalytic reduction of nitrite (FIG. 6E) was considerably faster in acidic conditions than neutral conditions. This is in accord with previous reports that lower pH usually is preferred in reduction reactions catalyzed by precious metals, as anions such as hydroxide (OH⁻) and carbonate ($CO_3^{2-}$), which naturally become more abundant under alkaline conditions, deactivate precious metal catalysts. Furthermore, the reaction of $H_2$ oxidation coupled with nitrite reduction produces bases that further increase pH. This obstacle, however, can be attenuated by providing acid from $CO_2$ gas in the MCfR system. In specific, the gas-transfer membranes can deliver multiple gases (for example, $H_2$ and $CO_2$) at a desired ratio. For the treatment of neutral-pH water, the nitrite reduction rate was doubled and tripled for 20% and 50% $CO_2$ supply along with $H_2$ than for no $CO_2$ supply (FIG. 6E).

Figure 6F:
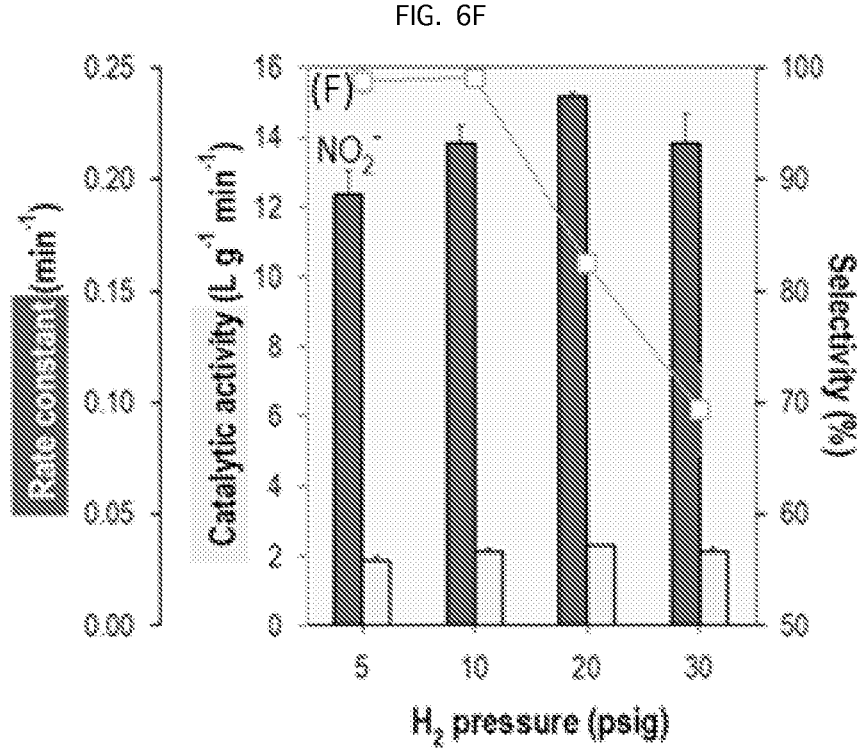
Figure 6G:
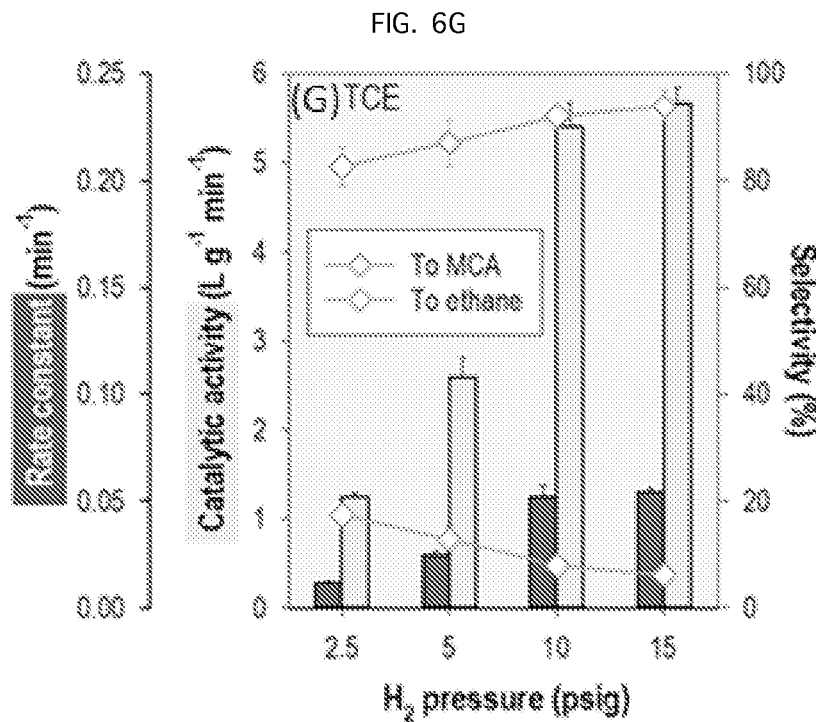

Higher $H_2$ pressure means a faster supply of the electron donor and can promote catalytic efficiency. For example, in the MCfR for TCE removal (FIG. 6G), an increase of the $H_2$ pressure from 2.5 to 15 psig not only increased catalytic activity by almost four times, but also enhanced the selectivity towards desired nontoxic ethane from 80% to 95%. However, the $H_2$ pressure needs to be carefully regulated for two reasons: 1) excess $H_2$ beyond "supply on demand" wastes $H_2$, which can lead to economic and safety problems; and 2) in some cases, too-rapid $H_2$ supply leads to selectivity towards undesired products. From example, when the $H_2$ pressure was higher than 10 psig, undesired ammonium accumulated as a result of over-reduction of nitrite beyond the harmless $N_2$ gas (FIG. 6F).

Figure 7:
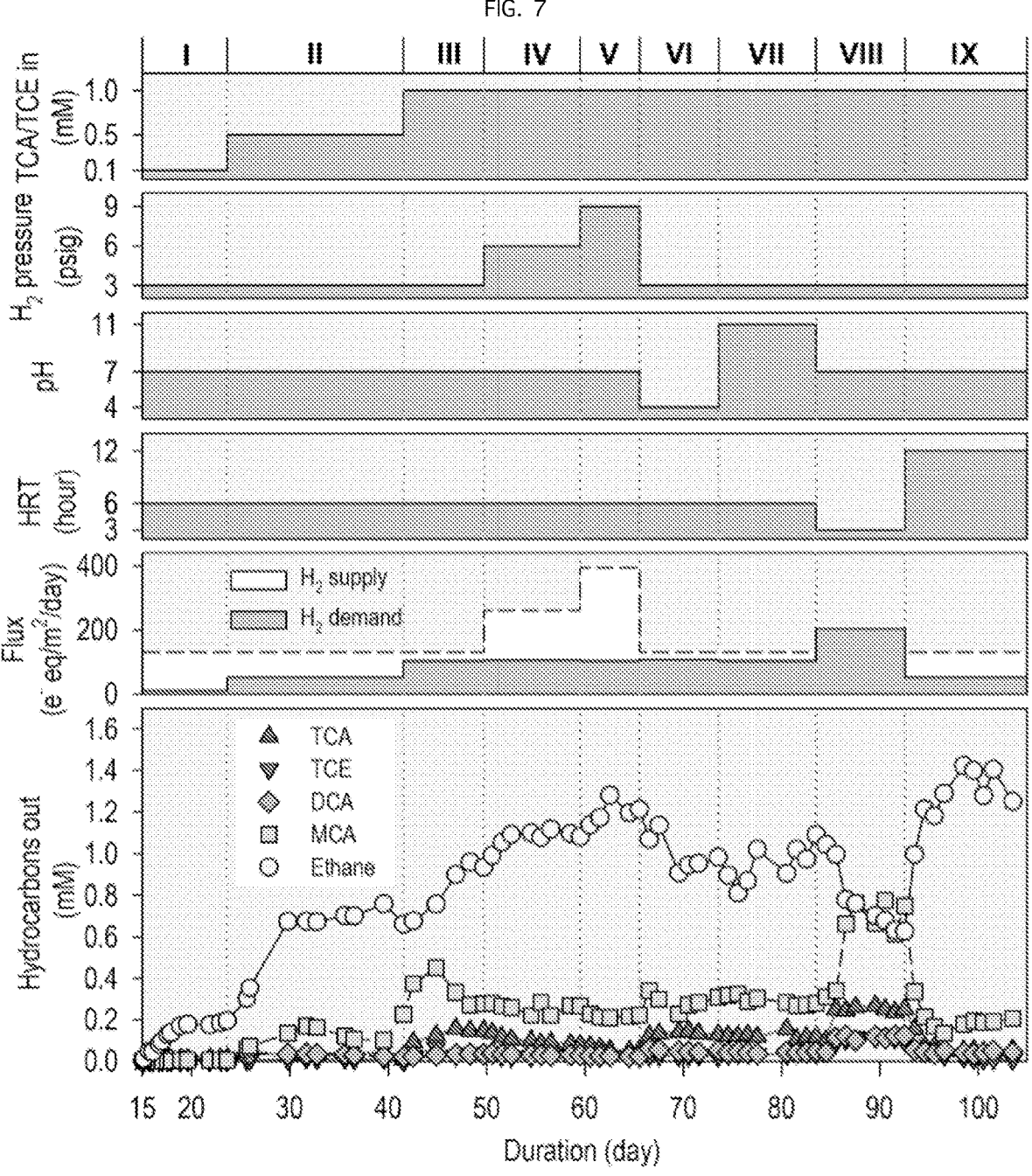
FIG. 7 depicts, in accordance with certain embodiments, results of continuous removal of TCA and TCE in a MCfR featuring Pd-film as the catalyst.

5. Application of MCfR: Long-Term Removal of Co-Existing TCA and TCE Catalyzed by $Pd^0$-Film Under Continuous Operation The $H_2$-MCfR system can operate continuously for long-term removal of a sole or multiple oxidized contaminants from water with minimal detachment or deactivation of the precious metal-film catalysts. For example, the $H_2$-MCfR was continuously fed with water contaminated by TCA and TCE for over 90 days. FIG. 7 presents the operational conditions and effluent results. Tables 2-4 summarizes the average performance results at steady states of nine stages featuring a range of influent TCA/TCE concentrations, $H_2$ pressures, pHs, and HRTs. Overall, the TCA and TCE removals were substantial during the 90-day operation. When the total surface loading of TCA and TCE was no more than 2 $g/m^2/day$ (Stages I to VII and IX), TCA and TCE removals at steady state were over 96% and 90%, respectively. When the total surface loading was doubled (Stage VIII), the TCA and TCE removals at steady state only moderately decreased, to 89% and 75%, respectively.

Weekly monitoring of Pd concentrations in the effluent samples reveal that detached $Pd^0$ from the membrane surface was minimal ($6.2\pm4.4$ µg/L). The cumulative catalyst loss during the 90-day operation was 0.16 mg, or only 4% of the total Pd coated on the membrane. These results verify that the MCfR system is capable of long-term treatment of contaminants at high surface loading with minimal loss of the catalyst quantity or quality.

6. Activation of MCfR: Forming a Pd/Rh Catalyst Film

Figure 8:
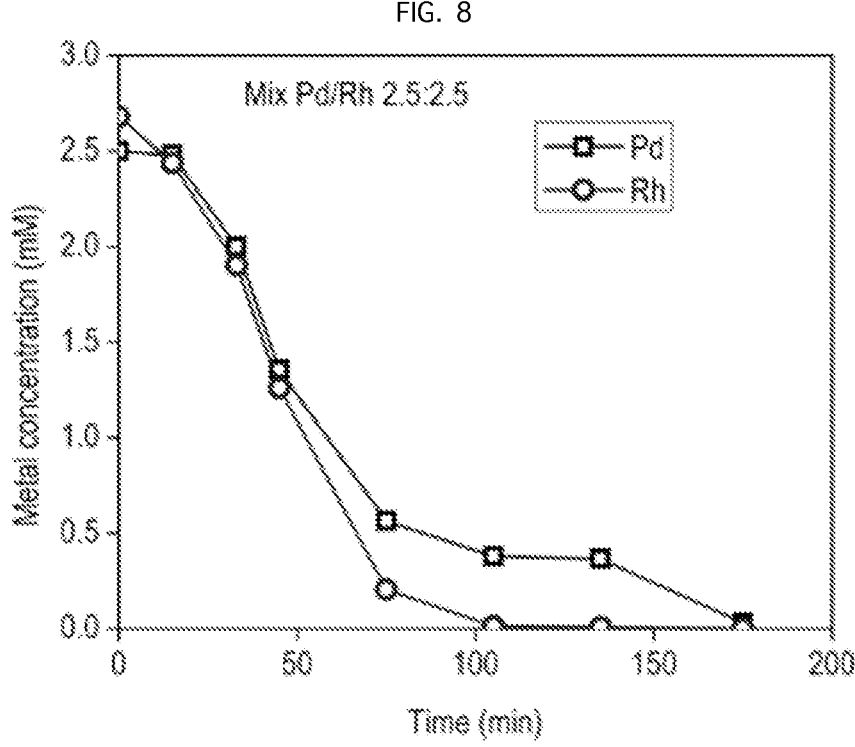
FIG. 8 depicts, in accordance with certain embodiments, the concentration changes of Pd(II) and Rh(III) in the precious metal medium during the establishment of the catalyst film.
Figures 9A, 9B, 9C, 9D:
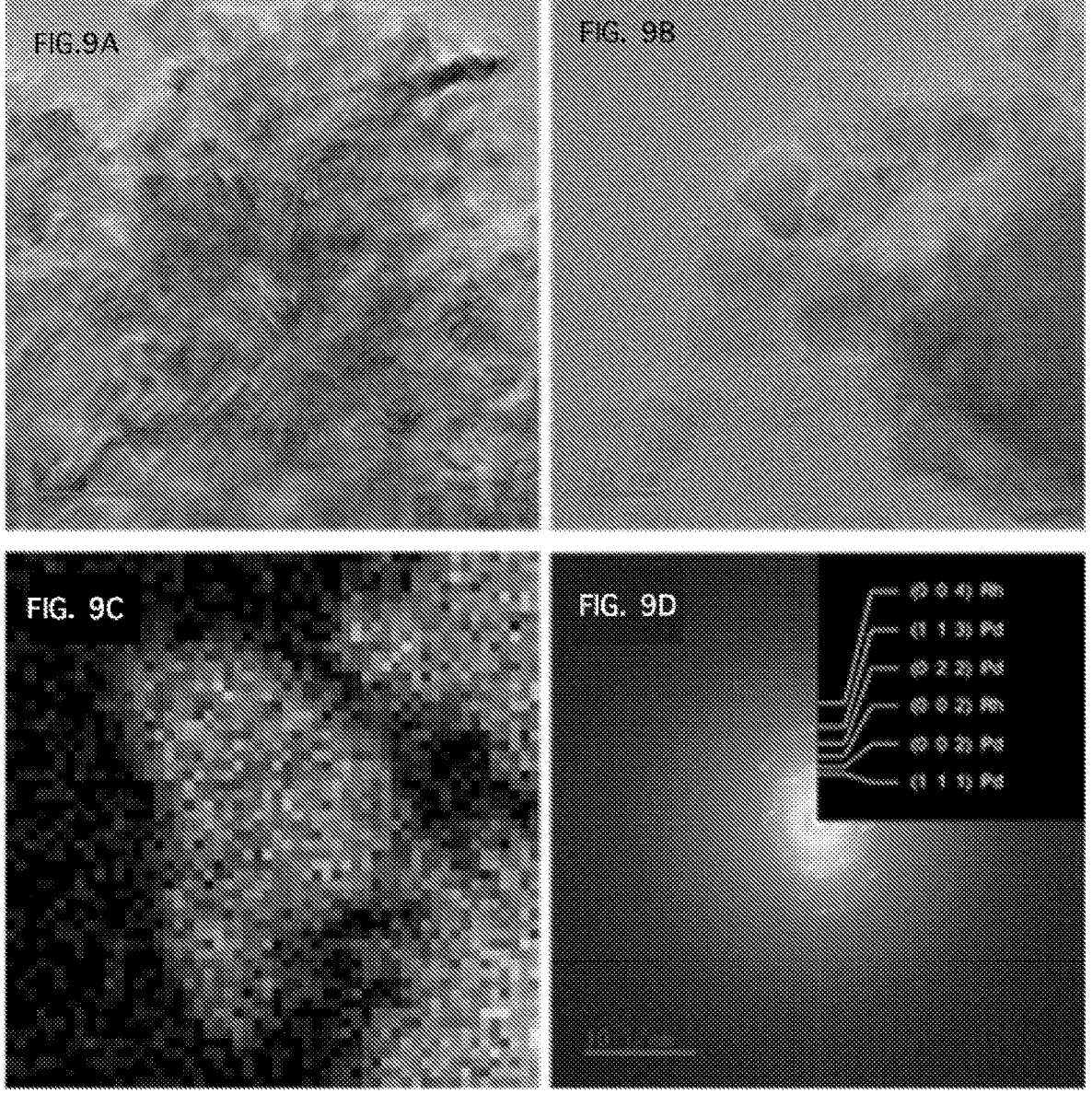
FIGS. 9A-9D depict, in accordance with certain embodiments, the characteristics of a Pd/Rh catalyst film as shown from microscopy and spectroscopy images.

For a bench-scale MCfR featuring a Pd/Rh-film, the concentration of Pd and Rh in the precious metal medium was 2.5 mM for both metals. FIG. 8 shows the concentration profile of the Pd and Rh species over time in the MCfR. More than 99% of the total Pd ions and Rh ions were converted to $Pd^0$ and $Rh^0$ within 180 minutes of exposure to the precious metal medium (pH. Of 7, HRT=24 hours, $H_2$ gas provided at 20 psig). The spontaneously coated gas transfer membrane has a loading density of 5.6 g $Pd/m^2$ and 5.6 g $Rh/m^2$. FIGS. 9A and 9B are transmission electron microscopy images of the Pd/Rh-film, which show the Pd nanoparticles and the Rh nanoparticles are formed together, perhaps as alloy catalysts. FIGS. 9C and 9D are electron energy loss spectroscopy images that show the distribution of the Pd and Rh nanoparticles in the catalyst film. The Pd nanoparticles and Rh nanoparticles were distributed homogenously, and the diffraction patterns indicate presence on different planes. $Pd^0$ is present on four different planes: (1 1 1), (2 0 0), (2 2 0) and (3 1 1). $Rh^0$ only appears on two planes: (2 0 0) and (4 0 0).

For a bench-scale MCfR featuring a Pd/Ir-film, the concentration of Pd and Ir in the precious metal medium was 2.5 mM for both metals. Although Ir(IV) cannot be autocatalytically reduced to form $Ir^0$ NPs, $Pd^0$ catalysis, allowed Ir(IV) to be reduced and form $Ir^0$ NPs.

Figure 10A:
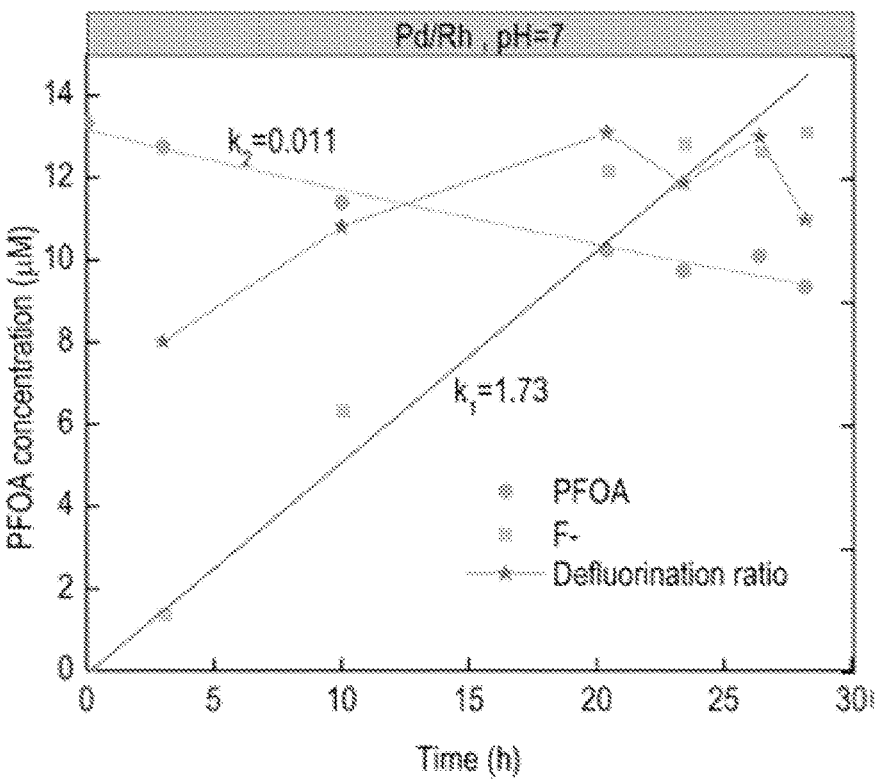
FIGS. 10A-10C depict, in accordance with certain embodiments, the removal and defluorination of PFOA by Pd/Rh-film and Pd/Ir-film at pH 7.
Figure 10B:
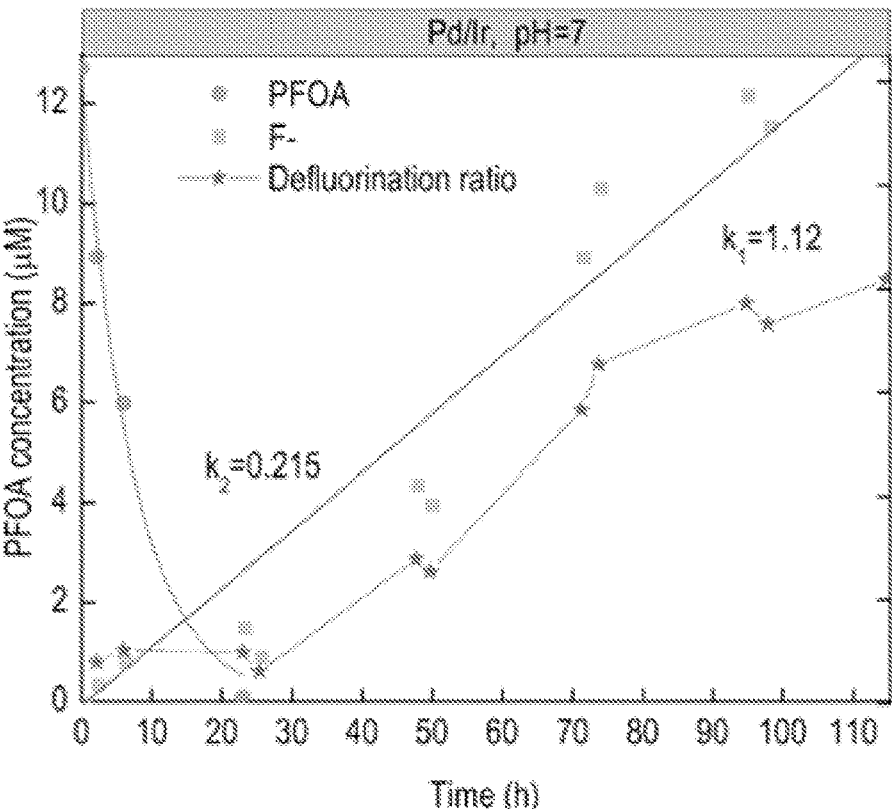

7. Application of a Bimetallic MCfR: Bimetallic Catalyst Films can Defluorinate PFOA The bench-scale MCfRs with the bimetallic catalyst films were run at ambient conditions (23° C. and 1 atm) with the influent pH being 7 at HRT of 24 hours. $H_2$ gas was provided at 20 psig. The results of PFOA and $F^-$ concentrations in a $H_2$-MCfR with a Pd/Rh-film are shown in FIG. 10A. A 29-hour test with this $H_2$-MCfR resulted in over 60% of the PFOA was depleted and reductive defluorination (43.8 µM $F^-$ accumulation, accounting for 21.9% of the total F in the ~10 µM PFOA) with a pseudo-zero-order rate of 1.73 µM/h. The results of PFOA and $F^-$ concentrations in a $H_2$-MCfR with a Pd/Ir-film are shown in FIG. 10B. A 115-hour test with this $H_2$-MCfR resulted in 99% PFOA depletion with a pseudo-first-order rate of 0.215 $h^{-1}$ with reductive defluorination (124.2 µM $F^-$ accumulation, accounting for 65.2% of the total F in the ~7.6 µM PFOA) with a pseudo-zero-order rate of 1.12 µM/h in the $H_2$-MPfR during.

Figure 10C:
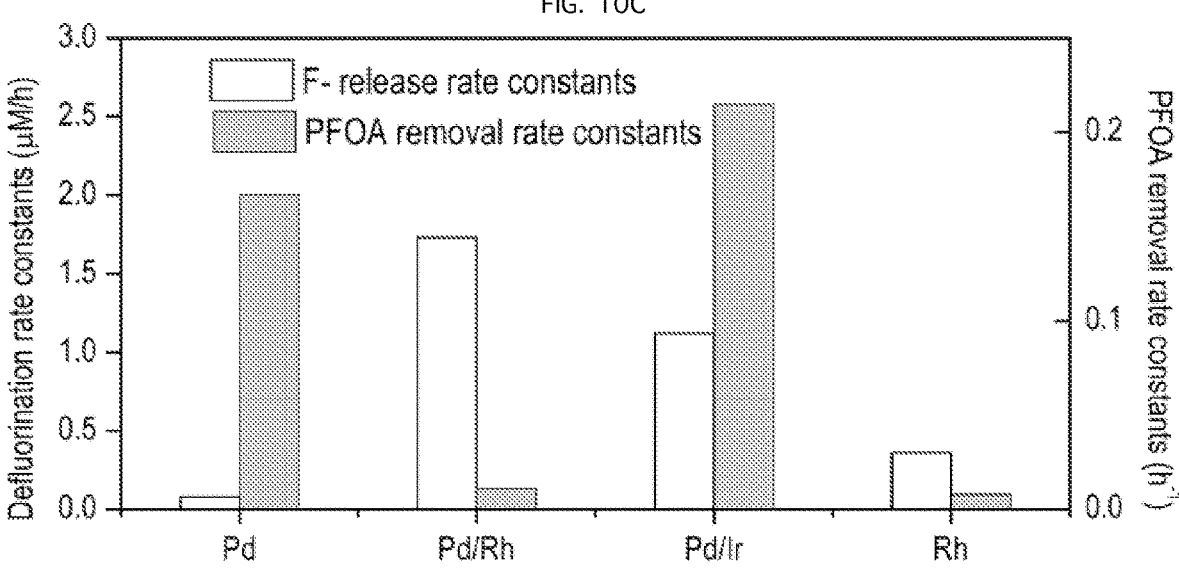

As summarized in FIG. 10C, Pd/Rh-film and $Pd^0/Ir^0$ showed much higher defluorination rates than mono-$Pd^0$ and mono-$Rh^0$. This was caused by the synergistic effect of the bimetallic catalyst. $Pd^0$ played a key role in adsorbing PFOA and $H_2$, while $Rh^0$ was responsible for carbon-fluoride dissociation. The Pd/Ir-film also showed much higher PFOA removal rate than mono-$Pd^0$ at pH 7.

Figure 11:
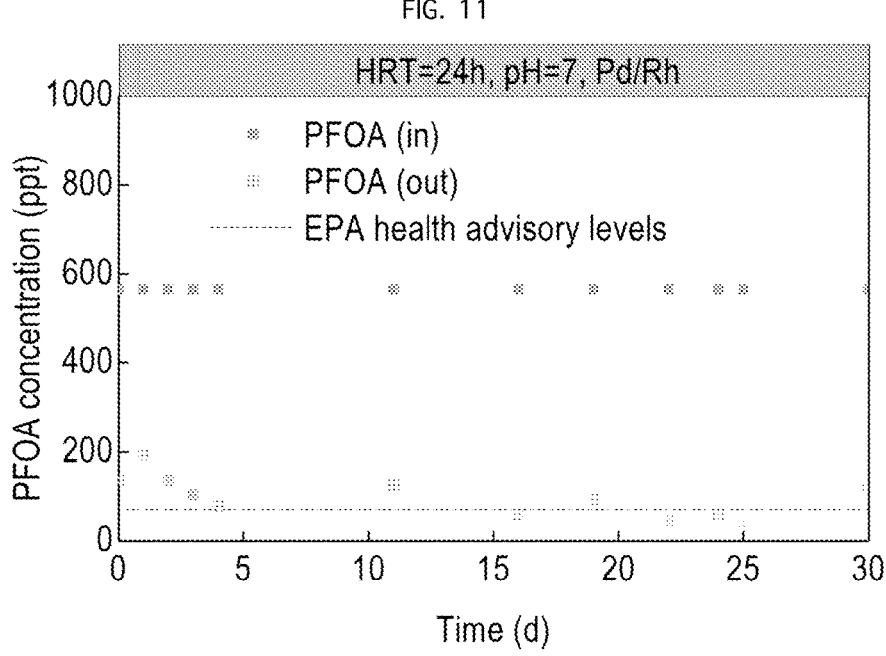
FIG. 11 depicts, in accordance with certain embodiments, the concentration of PFOA during continuous operation of a MCfR with a Pd/Rh-film.

8. Application of a Bimetallic MCfR: Long-Term Removal of PFOA Catalyzed by Pd/Rh-Film Under Continuous Operation FIG. 11 shows the PFOA concentrations in the influent and effluent of a MCfR with Pd/Rh-film under environmentally relevant concentrations of PFOA during a period of 30 days. Within the first day of the experiment, the effluent PFOA decreased sharply to <136 µM (or 75% removal). For the following 29 days, the effluent concentration of PFOA stabilized at $82\pm35$ ppt (or $83\pm8$% removal). Thus, bimetallic catalyst films are capable of long-term treatment of contaminants.

TABLE 1

| Organic contaminants catalyzed by Pd-film in the continuous $H_2$-MCfR. | | | |
|---|---|---|---|
| Target Contaminant | | Catalyst in MCfR | |
| Category | Name | Pathway | Desired Products |
| Herbicide/ Pesticide | Chlorophenols | Dechlorination Ring saturation | Phenol Cyclohexanol |
| | 2,4-dichlorophenoxyacetic acid | Dechlorination | Phenoxyacetic acid |
| | 3,6-dichloro-2-methoxybenzoic acid | Dechlorination | 2-methoxybenzoic acid |
| | 1-chloro-3-ethylamino-5- | Dechlorination | 3-ethylamino-5- |

TABLE 1-continued

| Organic contaminants catalyzed by Pd-film in the continuous $H_2$-MCfR. | | | |
|---|---|---|---|
| Target Contaminant | | Catalyst in MCfR | |
| Category | Name | Pathway | Desired Products |
| | isopropylamino-2,4,6-triazine | | isopropylamino-2,4,6-triazine |
| | 3,5-dibromo-4-hydroxybenzonitrile | Debromorination | 4-hydroxybenzonitrile |
| Disinfection byproduct | Trichloroacetic acid | Dechlorination | Acetic acid |
| | Trichloroacetonitrile | Dechlorination | Acetonitrile |
| | NDMA | Denitration | Dimethylamine |
| | Bromochloroiodomethane | Dehalogenation | Methane |
| Solvent | Trichloroethane | Trichloroethane | Ethane |
| | Trichloroethene | Chloroform Chain saturation | Ethane |
| Freon | Chloroform | Dechlorination | Methane |
| | CFC-11 | Dechlorination | Methane |
| | CFC-12 | Dechlorination | Methane |
| | CFC-113 | Dechlorination | Ethane |
| Precursors/ raw materials | Phenol | Ring saturation | Cyclohexanol |
| | Nitrophenols | Nitro-reduction | Aminophenols |
| | | Ring saturation | Aminocyclohexanols |
| | PFAS | Defluorination | Nonfluorinated hydrocarbons |
| Explosive | 1,3,5-Trinitro-1,3,5-triazinane | Denitration | hexamethylenetetramine |
| | 1,3,5,7-Tetranitro-1,3,5,7-tetrazoctane | Denitration | 1,3,5,7-Tetrazocane |
| | TNT | Nitro-reduction | 2,4,6-Triaminotoluene |

TABLE 2

Average performance results at steady states in the continuous $H_2$-MCfR (8 mg-Pd/m²-membrane) with various influent TCA concentration, $H_2$ pressure, pH, and HRT.

| | | | | | TCA | | | |
|---|---|---|---|---|---|---|---|---|
| Stage | $H_2$ psig | pH s.u. | HRT hour | $C_{in}$ mM | Surface Loading g/m²/d | $C_{out}$ μM | Flux g/m²/d | Removal % |
| I | 3 | 7 | 6.0 ± 0.3 | 0.1 | 0.10 ± 0.02 | 11.2 ± 1.6 | 0.09 ± 0.00 | 88.8 ± 1.6 |
| II | 3 | 7 | 6.2 ± 0.3 | 0.5 | 0.50 ± 0.03 | 35.8 ± 6.7 | 0.44 ± 0.01 | 92.8 ± 1.3 |
| III | 3 | 7 | 6.2 ± 0.4 | 1 | 1.00 ± 0.07 | 173.4 ± 15.0 | 0.93 ± 0.02 | 87.5 ± 1.5 |
| IV | 6 | 7 | 6.1 ± 0.3 | 1 | 1.02 ± 0.05 | 89.7 ± 10.3 | 0.92 ± 0.04 | 91.0 ± 1.0 |
| V | 9 | 7 | 6.2 ± 0.2 | 1 | 1.00 ± 0.03 | 57.8 ± 10.0 | 0.94 ± 0.02 | 94.2 ± 1.0 |
| VI | 3 | 4 | 6.0 ± 0.3 | 1 | 1.03 ± 0.05 | 133.7 ± 8.1 | 0.90 ± 0.05 | 86.8 ± 0.8 |
| VII | 3 | 11 | 6.2 ± 0.1 | 1 | 1.0 ± 0.01 | 118.9 ± 31.6 | 0.88 ± 0.01 | 88.1 ± 2.2 |
| VIII | 3 | 7 | 3.2 ± 0.2 | 1 | 1.94 ± 0.07 | 251.0 ± 12.5 | 1.45 ± 0.06 | 74.9 ± 1.2 |
| IX | 3 | 7 | 12.3 ± 0.2 | 1 | 0.50 ± 0.03 | 51.5 ± 4.0 | 0.48 ± 0.03 | 94.9 ± 0.4 |

50

TABLE 3

Average performance results at steady states in the continuous $H_2$-MCfR (8 mg-Pd/m²-membrane) with various influent TCE concentration

| | | | | | TCE | | | |
|---|---|---|---|---|---|---|---|---|
| Stage | $H_2$ psig | pH s.u. | HRT hour | $C_{in}$ mM | Surface Loading g/m²/d | $C_{out}$ μM | Flux g/m²/d | Removal % |
| I | 3 | 7 | 6.0 ± 0.3 | 0.1 | 0.10 ± 0.01 | 0.7 ± 0.8 | 0.10 ± 0.00 | 99.3 ± 0.8 |
| II | 3 | 7 | 6.2 ± 0.3 | 0.5 | 0.49 ± 0.03 | 12.5 ± 2.2 | 0.48 ± 0.00 | 97.5 ± 0.4 |
| III | 3 | 7 | 6.2 ± 0.4 | 1 | 0.98 ± 0.07 | 36.3 ± 8.5 | 0.95 ± 0.01 | 96.7 ± 0.9 |
| IV | 6 | 7 | 6.1 ± 0.3 | 1 | 1.00 ± 0.05 | 27.3 ± 3.5 | 0.97 ± 0.01 | 97.3 ± 0.4 |

TABLE 3-continued

| | | | | | TCE | | | |
|---|---|---|---|---|---|---|---|---|
| | | | | | Average performance results at steady states in the continuous H₂-MCfR (8 mg-Pd/m²-membrane) with various influent TCE concentration | | | |
| Stage | $H_2$ psig | pH s.u. | HRT hour | $C_{in}$ mM | Surface Loading g/m²/d | $C_{out}$ μM | Flux g/m²/d | Removal % |
| V | 9 | 7 | 6.2 ± 0.2 | 1 | 0.98 ± 0.02 | 22.8 ± 1.4 | 0.95 ± 0.01 | 97.7 ± 0.1 |
| VI | 3 | 4 | 6.0 ± 0.3 | 1 | 1.02 ± 0.05 | 27.7 ± 2.6 | 0.95 ± 0.01 | 97.2 ± 0.3 |
| VII | 3 | 11 | 6.2 ± 0.1 | 1 | 0.98 ± 0.01 | 39.8 ± 3.2 | 0.95 ± 0.01 | 96.0 ± 0.3 |
| VIII | 3 | 7 | 3.2 ± 0.2 | 1 | 1.91 ± 0.07 | 112.5 ± 12.5 | 0.95 ± 0.01 | 88.8 ± 1.3 |
| IX | 3 | 7 | 12.3 ± 0.2 | 1 | 0.50 ± 0.03 | 12.4 ± 4.8 | 0.49 ± 0.02 | 98.8 ± 0.5 |

TABLE 4

Average DCA, MCA, and ethane selectivity during different stages.

| | | | | Selectivity | | |
|---|---|---|---|---|---|---|
| Stage | $H_2$ psig | pH s.u. | HRT hour | DCA % | MCA % | Ethane % |
| I | 3 | 7 | 6.0 ± 0.3 | 4.1 ± 0.8 | 1.9 ± 0.8 | 94.0 ± 0.8 |
| II | 3 | 7 | 6.2 ± 0.3 | 3.1 ± 0.4 | 11.3 ± 1.1 | 85.6 ± 1.5 |
| III | 3 | 7 | 6.2 ± 0.4 | 2.5 ± 0.1 | 15.3 ± 1.9 | 82.2 ± 1.8 |
| IV | 6 | 7 | 6.1 ± 0.3 | 1.5 ± 0.1 | 12.6 ± 1.3 | 85.9 ± 1.5 |
| V | 9 | 7 | 6.2 ± 0.2 | 1.3 ± 0.1 | 10.8 ± 0.4 | 87.9 ± 0.4 |
| VI | 3 | 4 | 6.0 ± 0.3 | 2.4 ± 0.2 | 14.2 ± 1.6 | 83.4 ± 1.7 |
| VII | 3 | 11 | 6.2 ± 0.1 | 2.2 ± 0.1 | 14.1 ± 0.8 | 83.7 ± 0.9 |
| VIII | 3 | 7 | 3.2 ± 0.2 | 6.0 ± 0.3 | 35.0 ± 3.8 | 58.9 ± 4.0 |
| IX | 3 | 7 | 12.3 ± 0.2 | 2.1 ± 0.3 | 9.5 ± 0.5 | 88.4 ± 0.6 |

What is claimed is:

1. A method of establishing a catalyst film for long-term removal of oxidized contaminants from a fluid, the method comprising:

providing a non-porous gas transfer membrane, wherein the non-porous gas transfer membrane comprises a gas-phase side and a liquid-phase side;

contacting the liquid-phase side of the non-porous gas transfer membrane with a precious metal medium, the precious metal medium comprising a precious metal salt and a solvent; and contacting the gas-phase side of the non-porous gas transfer membrane with hydrogen (H₂) gas at a sufficient partial pressure to convert at least 90% of the precious metal salt in the precious metal medium to an elemental form in the form of nanoparticles with a mean diameter of less than 5 nm;

wherein the elemental form of the precious metal is deposed on the liquid-phase side of the non-porous gas transfer membrane thereby forming the catalyst film.

2. The method of claim 1, wherein the precious metal salt comprises palladium (II).

3. The method of claim 2, wherein the precious metal salt further comprises rhodium (III), ruthenium (III), or iridium (IV).

4. The method of claim 2, wherein the precious metal salt consists of:

palladium (II), palladium (II) and rhodium (III), palladium (II) and ruthenium (III), or palladium (II) and iridium (IV).

5. The method of claim 1, wherein the pH of the precious metal medium is 7±0.5.

6. The method of claim 1, wherein the gas-phase side of the non-porous gas transfer membrane is contacted with H₂ gas at a sufficient partial pressure to convert at least 99% of the precious metal in the precious metal medium to elemental form.

7. The method of claim 1, wherein the sufficient partial pressure of H₂ gas to convert at least 90% of the precious metal in the precious metal medium to elemental form is 10±1 psig.

8. The method of claim 1, wherein the concentration of the precious metal in the precious metal medium is 0.1-5 mM.

9. The method of claim 8, wherein the concentration of the precious metal in the precious metal medium is 0.1±0.01 mM, 1±0.1 mM, 2±0.2 mM, or 5±0.5 mM.

10. The method of claim 1, wherein the solvent is selected from the group consisting of: water, salt solution, hydrochloric acid, methanol, ethanol, acetonitrile, toluene, dichloromethane, chloroform, and tetrahydrofuran.

11. A method of removing oxidized contaminants from a fluid, the method comprising:

establishing a catalyst film, the catalyst film comprising precious metal nanoparticles on a non-porous gas transfer membrane;

contacting a fluid containing oxidized contaminants with the catalyst film; and contacting the catalyst film with hydrogen (H₂) gas at a sufficient partial pressure to reduce the oxidized contaminants;

wherein the oxidized contaminants are selected from at least one member of the group consisting of: chlorophenols, 2,4-dichlorophenoxyacetic acid, 3,6-dichloro-2-methoxybenzoic acid, 1-chloro-3-ethylamino-5-isopropylamino-2,4,6-triazine, 3,5-dibromo-4-hydroxybenzonitrile, trichloroacetic acid, trichloroacetonitrile, NDMA, bromochloroiodomethane, chloroform, CFC-11, CFC-12, CFC-113, phenol, nitrophenols, PFAS 1,3,5-Trinitro-1,3,5-triazinane, 1,3, 5,7-Tetranitro-1,3,5,7-tetrazoctane, and TNT.

12. The method of claim 11, wherein the step of establishing a catalyst film comprises:

providing the non-porous gas transfer membrane, the non-porous gas transfer membrane comprising a gas-phase side and a liquid-phase side;

contacting the liquid-phase side of the non-porous gas transfer membrane with a precious metal medium, the precious metal medium comprising a precious metal salt and a solvent; and contacting the gas-phase side of the non-porous gas transfer membrane with H₂ gas at a sufficient partial pressure to convert at least 90% of the precious metal salt in the precious metal medium to elemental form.

13. The method of claim 12, wherein the catalyst film is deposed on the liquid-phase side of the non-porous gas transfer membrane.

14. A method of establishing a catalyst film for long-term removal of oxidized contaminants from a fluid, the method comprising:

providing a non-porous gas transfer membrane, wherein the non-porous gas transfer membrane comprises a gas-phase side and a liquid-phase side;

contacting the liquid-phase side of the non-porous gas transfer membrane with a precious metal medium, the precious metal medium comprising a precious metal salt and a solvent; and contacting the gas-phase side of the non-porous gas transfer membrane with hydrogen ($H_2$) gas at a sufficient partial pressure to convert at least 90% of the precious metal salt in the precious metal medium to an elemental form;

wherein:

the oxidized contaminants are selected from at least one member of the group consisting of: chlorophenols, 2,4-dichlorophenoxyacetic acid, 3,6-dichloro-2-methoxybenzoic acid, 1-chloro-3-ethylamino-5-isopropylamino-2,4,6-triazine, 3,5-dibromo-4-hydroxybenzonitrile, trichloroacetic acid, trichloroacetonitrile, NDMA, bromochloroiodomethane, chloroform, CFC- 11, CFC-12, CFC-113, phenol, nitrophenols, PFAS, 1,3,5-Trinitro-1,3,5-triazinane, 1,3,5,7-Tetranitro-1,3, 5,7-tetrazoctane, and TNT; and the elemental form of the precious metal is in the form of a nanoparticle and is deposed on the liquid-phase side of the non-porous gas transfer membrane.

15. The method of claim 14, wherein the precious metal salt comprises palladium (II).

16. The method of claim 15, wherein the catalyst film consists of precious metal nanoparticles with a mean diameter of less than 5 nm.

17. The method of claim 15, wherein the precious metal salt further comprises rhodium (III), ruthenium (III), or iridium (IV).

18. The method of claim 15, wherein the precious metal salt consists of:

palladium (II), palladium (II) and rhodium (III), palladium (II) and ruthenium (III), or palladium (II) and iridium (IV).

19. The method of claim 14, wherein the sufficient partial pressure of $H_2$ gas to convert at least 90% of the precious metal in the precious metal medium to elemental form is 10±1 psig.

* * * * *